United States Patent
Hancock et al.

(10) Patent No.: US 9,963,199 B2
(45) Date of Patent: May 8, 2018

(54) COMPONENTS, SYSTEMS AND METHODS OF BICYCLE-BASED NETWORK CONNECTIVITY AND METHODS FOR CONTROLLING A BICYCLE HAVING NETWORK CONNECTIVITY

(71) Applicant: Fallbrook Intellectual Property Company LLC, Cedar Park, TX (US)

(72) Inventors: David Barton Hancock, Austin, TX (US); Christopher M. Vasiliotis, Austin, TX (US); Brian Benjamin Sweet, Leander, TX (US); Charles B. Lohr, Austin, TX (US); Daniel J. Dawe, Austin, TX (US); Eric Tanner, Hutto, TX (US); Jeremy Carter, Austin, TX (US); Jeffrey A. Birchak, San Diego, CA (US); Wayne Leroy Contello, Austin, TX (US); Russell Charles Whisler, Austin, TX (US); Kevin Alan Gust, Austin, TX (US); Matthew R. Bazyn, Leander, TX (US)

(73) Assignee: Fallbrook Intellectual Property Company LLC, Cedar Parks, TX (US)

( * ) Notice: Subject to any disclaimer, the term of this patent is extended or adjusted under 35 U.S.C. 154(b) by 228 days.

(21) Appl. No.: 14/818,040

(22) Filed: Aug. 4, 2015

(65) Prior Publication Data
US 2016/0039496 A1 Feb. 11, 2016

Related U.S. Application Data

(60) Provisional application No. 62/033,575, filed on Aug. 5, 2014.

(51) Int. Cl.
*B62M 23/00* (2006.01)
*B60W 10/08* (2006.01)
(Continued)

(52) U.S. Cl.
CPC .......... *B62M 23/00* (2013.01); *B60L 11/007* (2013.01); *B60L 11/1838* (2013.01);
(Continued)

(58) Field of Classification Search
CPC ....... B62M 23/00; B60W 10/08; B60W 10/10
See application file for complete search history.

(56) References Cited

U.S. PATENT DOCUMENTS

| 5,995,895 A | 11/1999 | Watt et al. |
| 8,321,097 B2 | 11/2012 | Vasiliotis et al. |

(Continued)

FOREIGN PATENT DOCUMENTS

| DE | 102009016869 | 10/2010 |
| DE | 102012210842 | 1/2014 |

(Continued)

OTHER PUBLICATIONS

Invitation to Pay Additional Fees dated Oct. 13, 2015 in PCT/US2015/043598.

(Continued)

*Primary Examiner* — Edwin A Young
(74) *Attorney, Agent, or Firm* — Knobbe Martens Olson & Bear LLP

(57) ABSTRACT

A bicycle configured for communication with other bicycles, a centralized server, client computing devices and third party servers allows the rider to be connected with friends, coaches/trainers, and third party vendors including vendors associated with lodging, food, and other conveniences, vendors associated with bike servicing, equipment, warranties, and other bike related products and services, and vendors associated with routes, areas or destinations. Information may be communicated in real time or stored in memory and communicated to servers, client devices, other riders, etc., at a later date. Information may be communi- (Continued)

cated to the bike controller for route planning, service scheduling, training purposes and the like. Information communicated to or from the bicycle may be performed as indicated by the rider or there may be predetermined rules or guidelines for what information is collected and to whom the information may be sent to or received from.

26 Claims, 9 Drawing Sheets

(51) Int. Cl.

| | | |
|---|---|---|
| B60W 10/10 | (2012.01) | |
| B60W 30/188 | (2012.01) | |
| B62M 6/50 | (2010.01) | |
| F16H 59/44 | (2006.01) | |
| F16H 59/66 | (2006.01) | |
| F16H 61/02 | (2006.01) | |
| G01S 19/19 | (2010.01) | |
| G01S 19/25 | (2010.01) | |
| B62M 6/45 | (2010.01) | |
| B62M 25/08 | (2006.01) | |
| B60L 11/00 | (2006.01) | |
| B60L 11/18 | (2006.01) | |
| B62J 99/00 | (2009.01) | |

(52) U.S. Cl.
CPC ............ *B60W 10/08* (2013.01); *B60W 10/10* (2013.01); *B60W 30/188* (2013.01); *B62M 6/45* (2013.01); *B62M 6/50* (2013.01); *B62M 25/08* (2013.01); *F16H 59/44* (2013.01); *F16H 59/66* (2013.01); *F16H 61/0204* (2013.01); *G01S 19/19* (2013.01); *G01S 19/25* (2013.01); *B60L 2200/12* (2013.01); *B60L 2240/642* (2013.01); *B60L 2240/70* (2013.01); *B60L 2250/20* (2013.01); *B60W 2510/244* (2013.01); *B60W 2520/10* (2013.01); *B60W 2550/143* (2013.01); *B60W 2550/406* (2013.01); *B60W 2710/081* (2013.01); *B60W 2710/1005* (2013.01); *B60W 2720/10* (2013.01); *B62J 2099/0013* (2013.01); *F16H 2059/666* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | |
|---|---|---|
| 8,506,452 B2 | 8/2013 | Pohl et al. |
| 2002/0179348 A1* | 12/2002 | Tamai ................... F02D 41/062 180/65.25 |
| 2003/0071436 A1* | 4/2003 | Fujii ..................... B62M 25/08 280/260 |
| 2003/0096674 A1 | 5/2003 | Uno |
| 2007/0193391 A1 | 8/2007 | Armstrong et al. |
| 2008/0071436 A1 | 3/2008 | Dube et al. |
| 2010/0181130 A1* | 7/2010 | Chou ....................... B62M 6/40 180/206.7 |
| 2010/0198453 A1 | 8/2010 | Dorogusker et al. |
| 2010/0228405 A1 | 9/2010 | Morgal et al. |
| 2010/0313614 A1 | 12/2010 | Rzepecki |
| 2011/0254673 A1 | 10/2011 | Jean et al. |
| 2012/0029744 A1 | 2/2012 | Yun et al. |
| 2012/0035011 A1* | 2/2012 | Menachem ............ B62M 9/122 474/126 |
| 2012/0239235 A1 | 9/2012 | Voigtlaender |
| 2015/0360747 A1 | 12/2015 | Baumgaertner |
| 2017/0225742 A1 | 8/2017 | Hancock et al. |

FOREIGN PATENT DOCUMENTS

| | | |
|---|---|---|
| DE | 102012212526 | 1/2014 |
| DE | 102012222087 | 6/2014 |
| DE | 102013201101 | 7/2014 |
| DE | 102013214169 | 1/2015 |
| EP | 2 464 560 | 6/2012 |
| EP | 2 357 128 | 8/2014 |
| JP | 10-307964 | 11/1998 |
| JP | 2011-178341 | 9/2011 |
| JP | 2012-121338 | 6/2012 |
| JP | 2013-147245 | 8/2013 |
| KR | 10-1339282 | 1/2014 |
| TW | 201339049 | 10/2013 |
| WO | WO 10/094515 | 8/2010 |
| WO | WO 11/124415 | 10/2011 |
| WO | WO 11/138175 | 11/2011 |

OTHER PUBLICATIONS

International Search Report and Written Opinion dated Jan. 21, 2016 in PCT/US15/043598.

* cited by examiner

| 310 → | 320 → | 330 → | 340 → | 350 → |
|---|---|---|---|---|
| RIDER ID | AGE | GENDER | SKILL | TYPE |
| 10010 | 22 | M | 2 | S |
| 14632 | 40 | F | 3 | T |
| 57338 | 51 | M | 6 | R |

FIG. 3A

| 10010 | | | | | |
|---|---|---|---|---|---|
| RESTING HEART RATE | MAX SPEED (KPH) | MAX TORQUE (NM) | MAX DISTANCE (KM) | MAX PEDAL SPEED (RPM) | TOTAL DISTANCE (KM) |
| 54 | 56 | 43 | 202 | 154 | 34032 |

FIG. 3B 300-3

| 10010 RIDE | DISTANCE (KM) | TIME HR:MIN:SEC | USER RATING 0 - 100 | SLOPE |
|---|---|---|---|---|
| 1 | 70 | 1:05:36 | 75 | 10 |
| 2 | 83 | 1:12:40 | 100 | 0 |
| 3 | 104 | 1:40:03 | 40 | 12 |
| 4 | 65 | 0:56:33 | 80 | 8 |

FIG. 3C 300-4

| ROUTE ID | DISTANCE (KM) | MAX INCLINE % | MAX DECLINE % | MAX TILT ANGLE % | NUMBER OF RIDERS | ALTERNATE ROUTE ID |
|---|---|---|---|---|---|---|
| 4283 | 30 | 7 | 3 | 13 | 6,371 | 4567 |

FIG. 3D

COMPONENTS, SYSTEMS AND METHODS OF BICYCLE-BASED NETWORK CONNECTIVITY AND METHODS FOR CONTROLLING A BICYCLE HAVING NETWORK CONNECTIVITY

CROSS-REFERENCE TO RELATED APPLICATIONS

This application claims priority under 35 U.S.C. § 119(e) to U.S. Provisional Patent Application No. 62/033,575, filed Aug. 5, 2014. This application is related to U.S. Pat. No. 8,321,097, U.S. Pat. No. 8,506,452, and U.S. patent application Ser. No. 11/669,081. The disclosures of all of the above-referenced prior applications, publications, and patents are considered part of the disclosure of this application, and are incorporated by reference herein in their entirety.

BACKGROUND

Technological Field

Embodiments disclosed herein may be directed to a web-based bicycle, including embodiments incorporating the advantages and benefits of a continuously variable transmission or an electric motor.

Description of the Related Art

Global Positioning Systems or Global Navigation Satellite Systems (GPS/GNSS) provides location and time information anywhere on Earth where there is an unobstructed line of sight to four or more GPS satellites. GPS/GNSS systems are found in smart phones as well as dedicated positioning devices, and are increasingly being integrated in vehicles.

Many vehicles today include a transmission or other assembly configured with multiple selectable gears. Shifting is typically performed either manually, such as commonly found with bicycles, or automatically, such as commonly found in automobiles.

Manually shifting is generally performed in the absence of a load and involves a person disengaging the power source from the transmission, shifting gears and then re-engaging the power source. Disengaging the power source may be as simple as a user stopping or slowing pedaling, or may involve a user depressing a clutch. An advantage to manual shifting is the user determines when to shift, which may allow the person to anticipate when a shift will be needed and then execute the shift. Automatic transmissions typically operate in a reactive mode. That is, when there is a change in the either the power being applied or the load experienced by the transmission, the transmission can sense this change, disengage from the power source or the load (or both) and shift accordingly before reapplying the power or re-engaging the load. For vehicles having a powerful engine, reactive shifting is acceptable. However, for vehicles having a smaller motor, or for bicycles in which the rider provides at least some of the power, this is less than ideal. In fact, cyclists using manual transmissions (e.g. a front set of gears, a rear cog, and two shifting levers) and approaching an increased slope or grade might shift to a lower gear prior to reaching the increased slope in order to maintain a higher cadence in order to maintain momentum or speed.

Riders are constantly looking for ways to improve the riding experience.

SUMMARY OF CERTAIN EMBODIMENTS

A bicycle having network connectivity may have access to a wide range of information. Computing devices, including client devices such as laptop computers, handheld devices, tablets, etc., and servers including third party servers, may access information generated by a multitude of bicycles with controllers having network connectivity. Information shared between controllers and other computing devices may be used to improve a rider's ride as well as improve future rides. Embodiments disclosed herein may use location information, terrain information, rider preferences, biometric information and bicycle information to improve a rider experience. Recorded information about a ride may be shared with a coach or trainer, an equipment provider, a third party such as a warranty provider, a service provider, a retail merchant targeting riders (e.g., restaurants, apparel, lodging, equipment), etc.

Location information including GPS information may be used to determine a location of the rider, the speed of the rider, the bearing of the rider (the direction in which the rider is traveling or has traveled), and other ride information. Location information and a topographical map may also be used to predict terrain changes that will affect the ride. Terrain changes may include an increase in elevation, a grade, etc., or a decrease in elevation, a grade, etc. Rider preferences including an intended use (e.g., commuting, performance training, sport, touring, leisure, etc.), preferred terrain, preferred distance, etc., may be used to determine a route. Biometric information may include information about the current physical performance of the rider, as well as in comparison with previous rides. Bicycle information may include information about the particular equipment or configuration of a bicycle. Using these sources of information, embodiments may tailor or adjust a ride to better suit a rider's needs.

In some embodiments, two or more of location information, biometric information, rider preferences, terrain information and bicycle information may be analyzed together to achieve anticipatory shifting of a transmission to meet the rider's intended use, in which a controller is able to anticipate a change in terrain and adjust the speed ratio of the transmission prior to encountering the change in terrain. Embodiments may analyze this information to determine one or more courses of action.

A course of action for an increase in elevation, grade or slope may include adjusting a speed ratio to encourage a higher cadence before the bicycle reaches the terrain change. In embodiments having a continuously variable transmission, adjusting a speed ratio may include determining a present speed ratio of the transmission, and determining a desired speed ratio based on the present speed ratio and an expected change of grade of the route or determining a desired rate of change of the speed ratio from the present speed ratio to the desired speed ratio. Adjusting a speed ratio may also include adjusting the speed ratio to maintain a desired speed or momentum during the change of grade, which may include determining a desired rate of change of the speed ratio of the transmission. In embodiments having a motor or other power source, a course of action may include increasing speed, torque, or power generated by the motor to increase momentum of the bicycle before the bicycle reaches the terrain change. In these cases, increasing the cadence, power, torque, or speed before the bicycle reaches the terrain change allows the rider to maintain a continuous speed or continuous cadence, or otherwise meet the rider's intended use.

A course of action for a decrease in elevation, grade or slope may include adjusting a speed ratio to a lower cadence before the bicycle reaches the terrain change. In embodiments having a continuously variable transmission, adjusting a speed ratio may include determining a present speed ratio of the transmission, and determining a desired speed ratio based on the present speed ratio and an expected change of grade of the route or determining a desired rate of change of the speed ratio from the present speed ratio to the desired speed ratio. Adjusting a speed ratio may also include adjusting the speed ratio to maintain a desired speed or momentum during the change of grade, which may include determining a desired rate of change of the speed ratio of the transmission. In embodiments having a motor or other power source, a course of action may include decreasing speed, torque, or power generated by the motor to reduce momentum of the bicycle before the bicycle reaches the terrain change. In these cases, decreasing the cadence, power, torque, or speed before the bicycle reaches the terrain change allows the rider to maintain a continuous speed or otherwise meet the rider's intended use, may increase the efficiency or range of the motor or bicycle, and allows the cyclist to maintain control over the bicycle for improved safety.

Embodiments may use location information to determine areas on a route in which automatic shifting, including anticipatory shifting, is not practical. For example, a route may be substantially flat but with many slight elevation changes (e.g., a route having less than 5 meters of elevation change per kilometer, no grade greater than 1%), etc. These elevation changes may be less than the resolution of a GPS system, or a GPS system may only change elevation in increments of a minimum size. In these situations, a system having access to location information and a topographical map may determine that maintaining a constant a speed ratio may improve the efficiency of the transmission, a motor coupled to a transmission, or a bicycle having a motor and transmission. Embodiments may lock or otherwise hold a speed ratio constant through these portions of a route.

Data sampling may be based upon the route, the terrain, the rider or some other criteria other than time. A controller may determine that continuous data sampling is undesirable due to power constraints, and may adjust a data sampling rate accordingly. The first time a route is ridden, data sampling may be at a first rate, and subsequent rides by the same or different riders may increase or decrease the sampling rate. Over a flat route (or portion thereof), data sampling may be minimized. Over varied terrain, data sampling may be increased to get an improved profile of the route for future rides.

Communication between a bicycle and other bicycles, a central server, client computing devices, and third party servers may be managed based on various criteria. A controller in a bicycle may determine that streaming information to another controller or computing device is undesirable due to power constraints or connectivity. The controller may determine that streaming does not take place, or only streaming along selected portions of a route. The controller may store information for later uploading or communication with other controllers or computing devices.

Advantageously, the use of location information in conjunction with bicycle information allows embodiments of a bicycle to anticipate not only when to shift gears or adjust a speed ratio, but how much to shift or a rate of change for adjusting a speed ratio, or even when to not shift or adjust a speed ratio. Accordingly, embodiments may operate in modes not possible using existing systems and approaches.

Some embodiments disclosed herein may be implemented in a computer program product comprising at least one non-transitory computer readable medium storing instructions translatable by at least one processor to perform a method described herein.

Some embodiments disclosed herein may be implemented in a system, comprising one or more computing devices and a data system coupled to the one or more computing devices over a network. In some embodiments, the data system may comprise a processor configured to communicate with controllers, sensors, actuators, motors, and other control and power components on bicycles. The processor may also communicate with a single user bicycle as well as other bicycles. The processor may communicate using cellular networks, Wi-Fi networks, radio-frequency technology, or some other wireless technology using various protocols and techniques. In some embodiments, the processor may be further configured to generate an interface for presenting information to a user.

In one embodiment provided herein, a bicycle includes a frame, two wheels supported by the frame, a transmission, a bicycle speed sensor, and a controller communicatively coupled to the transmission and the bicycle speed sensor. The controller has a processor and a non-transitory memory storing a set of instructions executable by the processor to obtain rider information, obtain bicycle information including information from the bicycle speed sensor, obtain location information associated with the bicycle, obtain terrain information associated with the location information, and in response to an anticipated change in terrain, cause a change in a ratio of the transmission.

In another embodiment, a method for controlling a transmission of a bicycle by a controller is provided. The controller is communicatively coupled to a bicycle speed sensor and the transmission. The method includes obtaining rider information, obtaining bicycle information including information from the bicycle speed sensor, obtaining location information associated with the bicycle, obtaining terrain information associated with the location information, controlling the transmission according to a control scheme for the rider, and in response to an anticipated change in terrain, causing a change in a ratio of the transmission.

In still another embodiment provided herein, a bicycle includes a frame, two wheels supported by the frame, a drivetrain configured to propel the bicycle, and a controller communicatively coupled to a network. The controller has a processor and a non-transitory memory storing a set of instructions executable by the processor to obtain rider information for a rider of the bicycle, obtain bicycle information, determine location information associated with the bicycle, and obtain terrain information associated with the location information. The set of instructions also includes instructions executable by the processor to determine a set of routes for presentation to the rider based on the rider information, the bicycle information, the location information, and the terrain information, and present the set of routes to the rider.

In still a further embodiment, a controller is provided for use with a bicycle having a frame, two wheels supported by the frame, and a drivetrain for propelling the bicycle. The controller is communicatively coupled to a network and configured to communicate with a GPS receiver to determine a location of the bicycle, communicate with a map source and determine terrain information based upon the determined location of the bicycle, receive information about the bicycle, and determine a set of routes available to a rider based on the location of the bicycle, the terrain associated with the location of the bicycle, and at least one performance characteristic of the rider.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of this disclosure, and the disclosure includes all such substitutions, modifications, additions or rearrangements.

BRIEF DESCRIPTION OF THE DRAWINGS

FIGS. 3A-3F depict tables and graphs, illustrating a method for segmenting information associated with a web-enabled bicycle according to yet another embodiment;

DETAILED DESCRIPTION

Figure 1:
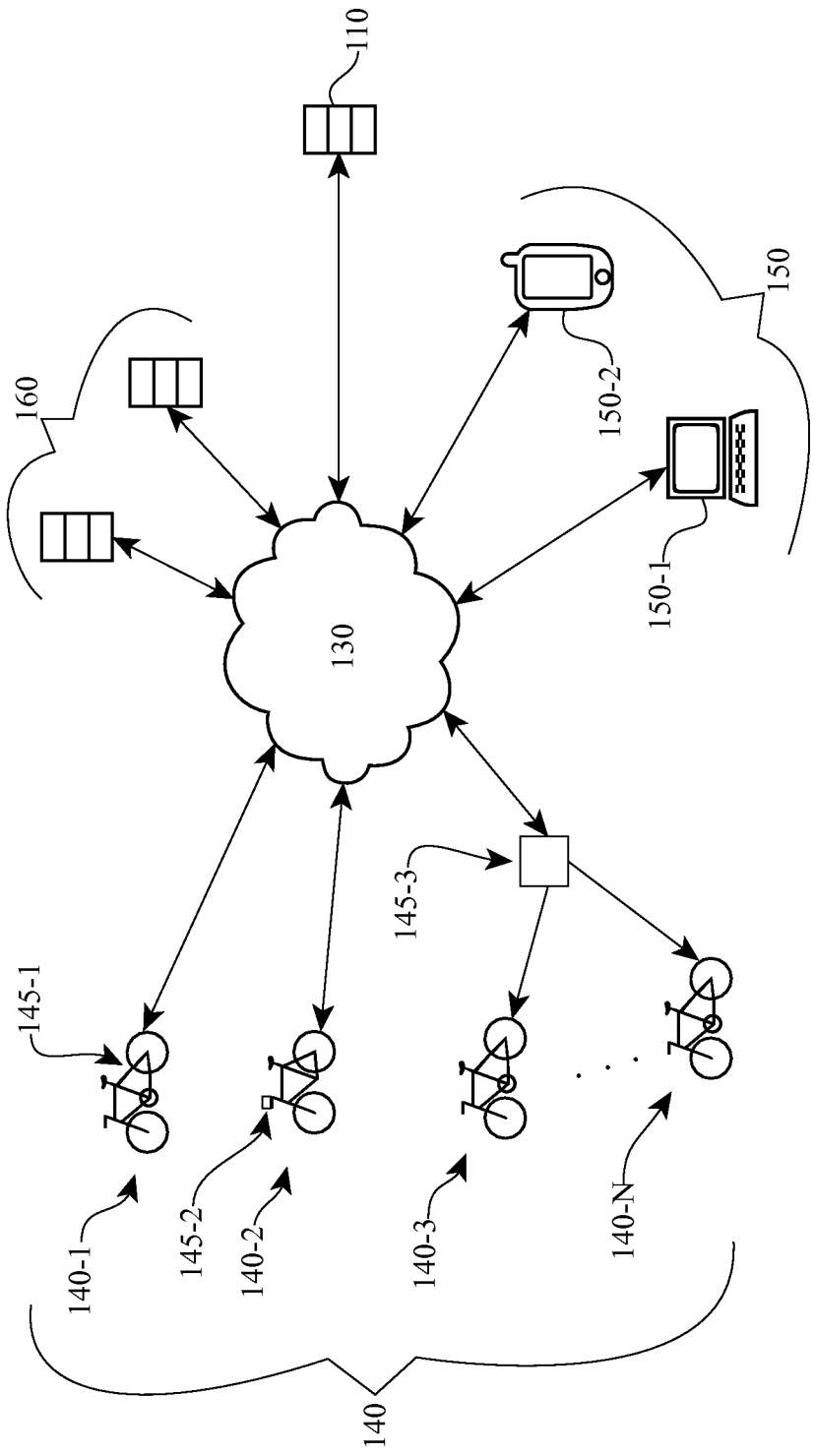
FIG. 1 depicts a high level diagram, illustrating a system for providing communication among controllers, computing devices and servers associated with a web-enabled bicycle according to one embodiment.

Various features and advantageous details are explained more fully with reference to the non-limiting embodiments that are illustrated in the accompanying drawings and detailed in the following description. Descriptions of well-known starting materials, processing techniques, components and equipment are omitted so as not to unnecessarily obscure the features and advantages they provide. It should be understood, however, that the detailed description and the specific examples, while indicating preferred embodiments, are given by way of illustration only and not by way of limitation. Various substitutions, modifications, additions and/or rearrangements within the spirit and/or scope of the underlying concepts will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, the use of the term "or" refers to an inclusive "or" and not to an exclusive "or." For example, a condition "A or B" is satisfied by any one of the following: A is true (or present) and B is false (or not present), A is false (or not present) and B is true (or present), or both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

At least portions of the functionalities or processes described herein can be implemented in suitable computer-executable instructions. The computer-executable instructions may be stored as software code components, agents or modules on one or more computer readable media accessible by a controller associated with a bicycle. A controller may be communicatively coupled over a network to other computing devices. As used herein, the term "communicatively coupled" refers to a connection for transferring information and data between devices. The connection is not restricted to a permanent or dedicated connection, but may also include temporary or limited connections. For example, communicatively coupling a server to a controller may indicate there exists a connection such that an agent or a software module may be transferred from the server to the controller and the connection may be terminated. When the controller wants to send information to the server, a new connection may be established, or an existing connection may be activated, etc.

Embodiments may generally be directed to a bicycle communicatively coupled to a computer or other information system via a network (also referred to as a "web-based bicycle" or "web bike"). However, those skilled in the art will appreciate that many of the features and advantages described herein may be realized on other types of vehicles including, but not limited to, tri-cycles, light electric vehicle (LEVs), electric bikes, and other wheeled vehicles. A bicycle, tricycle, LEV or other vehicle may utilize a continuously variable transmission. A continuously variable transmission may be utilized exclusively such that all power passes through the continuously variable transmission. A continuously variable transmission (CVT) may be integrated with other transmissions such that a portion of the power passes through the CVT and a portion passes through the other transmission. A continuously variable transmission (CVT) may be integrated with other transmissions such that the power passes through the CVT and the other transmission. Clutches and other mechanisms may be used to switch between power paths, transmissions, etc.

Embodiments disclosed herein may utilize location information, terrain information, rider information and bicycle information to determine control schemes for operating a transmission in various modes, including using anticipatory shifting for a transmission or anticipatory operation of a motor coupled to the transmission. A control scheme for operating a bicycle may include route planning. Route planning may be accomplished solely by controllers or systems described herein, or an intelligent agent, module or other set of software instructions may be implemented to communicate with and leverage a commercially available application. Examples of commercial applications that can be downloaded or purchased include MapMyRide® and Google® Maps. In some embodiments, information downloaded from a third party application may be integrated with information stored in a central server to provide more accurate route information. For example, information downloaded from a third party application might not be updated to reflect detours, closures, areas under repair, areas with poor conditions, areas generally unsuited for bicycles (including certain types of bicycles), etc. Information about a recent detour may be stored in a central server and compared to the third party information to determine that there is in fact a detour.

Users may ride bikes for various reasons. A rider may use a bike for commuting, sport, recreation, touring, rehabilitation or some other style. Embodiments may analyze rider information, terrain information, route information and bicycle information to assist in customizing the ride based on the style or the rider's intended use. Embodiments may further leverage the advantages of a CVT according to the rider's intended use or style. Embodiments disclosed herein may be useful for aggregating, analyzing, exchanging, or otherwise using information to improve a rider's experience.

Rider information may include biometric information such as heart rate, blood pressure, age, gender, height, weight, VO2max, physical challenges (including disabilities and other permanent or long term challenges or short term challenges that may be the result of surgery, injury or illness) or the like. Rider information may also include information such as past biometric performance information (e.g., maximum heart rate, minimum heart rate, average heart rate, core body temperature, breathing rate, etc.), past route performance information (e.g., fastest time, maximum bicycle speed, maximum pedal speed, maximum torque, minimum pedal speed, minimum torque, maximum power, average power, split times, distance covered, etc.), terrain preferences, route preferences, changes in resting heart rate, weight, or VO2 max or similar performance parameters, and the like. Rider information as described herein can include one of the above example parameters, or a combination of the above example parameters. In one non-limiting example, rider information includes split times and maximum power generated. In another non-limiting example, rider information includes distance covered and route preferences. In some embodiments, rider information may be normalized. For example, a rider may have two bicycles for riding on different terrain, located in different geographic locations, or otherwise resulting in two sets of rider information for the same rider. For example, for riders using CVTs, embodiments may compare tilt angles, speed ratios or other performance parameters of the CVT to determine a set of rider information. Embodiments may aggregate this information into a single set of rider information or single rider profile to meet the rider's intended use. Advantageously, customizing a ride based on the normalized rider information allows the rider to ride any bike having features disclosed herein and experience an improved ride.

Terrain information may include information about altitude, slope or grade, surface (e.g., road, path, trail, etc.), and include weather conditions such as snow, ice or rain which could have different effects on different surfaces. Terrain information may also include visibility. For example, a path through brush will generally have limited visibility, causing a rider to ride slower. A road on the eastern side of a mountain or through tall trees may experience darkness earlier than a road on the western side of the same mountain or passing through plains or passing near a large body of water having no obstructions. Embodiments of web bikes disclosed herein may obtain terrain information and customize a ride based on terrain, allowing a rider to take full advantage of terrain to achieve his/her riding goals. A server may receive store information, or an agent or other set of computer instructions may gather terrain information as needed.

Route information may include information about traffic, including traffic volume, traffic constituency, bottleneck areas, speed limit, speed information related to other areas on the route (e.g., average speed of cars traveling on a road, percentage of vehicles that exceed the speed limit on a road, etc.), number of other riders who have ridden the route or a portion thereof, average rating of the route by other riders who have ridden the route, average speed of other riders who have ridden the route, maximum speed of other riders who have ridden the route, average time for other riders to complete the route, and the like. Route information may be gathered by intelligent agents or modules of computer instructions being executed on controllers and forwarded to a central server. Route information may be analyzed and tailored to an individual rider.

Bike information may include information such as total distance covered relative to the frame, a component, a subassembly or the like. Bike information may include a batch number or other manufacturing tracking number. A tracking number may allow a manufacturer to compare bike performance among bikes from the same manufacturing batch, from the same supplier, etc. Bike information may also include information about a transmission on the bicycle, including a continuously variable transmission. Bike information about a continuously variable transmission may include information regarding the range of possible tilt angles or speed ratios. In embodiments having an electric motor, bike information may include power capacity (or power level) of a battery, maximum torque or speed output by a motor or drivetrain, maximum range of a drivetrain having a motor and transmission, etc. Bike information may also allow the performance of bicycles or components to be compared. Embodiments disclosed herein may use bike performance information in determining an appropriate route. For example, a bike with wider tires (such as a mountain bike) may be presented route options that include paths and trails spanning shorter distances, a bike with thin tires (such as a road bike) may be presented route options including longer distances but not on trails or paths, and a bike with mid-sized tires (such as a hybrid bike) may be presented route options including paths but not trails and routes spanning mid-range distances.

Using the information described above, a ride may be customized for a rider. The ride may be customized based on the bicycle being ridden, the route being ridden, a performance goal selected by the rider, etc.

One example illustrating how a ride may be customized involves the use of heart rate as a base parameter in selecting and riding a route. It is common for people to designate a target heart rate or heart rate range for a workout, and there are existing exercise systems (e.g., treadmills, stationary bikes) that can adjust the speed, cadence, incline, resistance or other parameter of the exercise system to ensure the user's heart rate does not exceed a maximum heart rate or stays within a target range. Using embodiments disclosed herein, a user enters in a parameter indicating a time duration of the ride, a controller operably coupled to a bicycle may use the rider's heart rate and the designated time duration rate for determining a route. The controller may also consider other information, such as other rider information, terrain information, route information or bicycle information for determining the route, including identifying different routes that allow the user to not exceed a maximum heart rate or keep the heart rate within a specified range, identifying different routes that might cause the rider to exceed a maximum heart rate or that will result in a wide variation in heart rate, identifying routes based on the experiences and ratings of other riders having similar goals, preferences, or interests as the rider, identifying routes based on the bicycle, or some other criteria.

As mentioned above, heart rate may be used as a base. However, using other elements of rider information, a set of routes may be presented to the user for manual selection, a route may be automatically selected, one or more routes may be discouraged from use, etc. As an example, if a user wants to ride for 40 minutes while keeping his/her heart rate between 120-140 beats per minute (bpm), embodiments may first determine what kind of bike the user will be riding. Embodiments may also consider the rider's performance in the last few rides to get a better idea of what kind of terrain the rider is used to, how well the rider adapts to variations in terrain, what type of surface the rider prefers, and the average and maximum times the rider has needed to finish the specified distance. Embodiments may also consider the possibility for assisting the rider. For example, if the rider is using an electricity assist bicycle (also commonly referred to as an e-bike), embodiments may identify a first route that covers 20 kilometers unassisted, 25 kilometers with minor assistance, or 40 kilometers with more assistance. Alternatively, if the rider wants to cover a specific distance, embodiments may determine that the rider may complete the route in 40 minutes with full assistance, 50 minutes with some assistance, or 60 minutes with no assistance. In some embodiments, it may be determined that a certain portion of the route is narrow and has a significant amount of car traffic, and an electric motor may be used to assist the rider in maintaining a desired (minimum) speed through that portion of the route for safety reasons. Other scenarios are possible. Using this information, embodiments may automatically select a route for the rider, or may present options to the rider for selection or approval.

In some embodiments, a set of routes may be selected by a controller. Selecting a set of routes by a controller may include identifying routes appropriate for the rider. A route may be selected (or deselected) based on the rider's ability. For example, a rider who has ridden only on roads with light traffic may be presented with a set of routes that typically have light to medium traffic, but routes experiencing heavy traffic or high speed traffic might not be presented. A route may be selected (or deselected) based on the average skill level of other cyclists. For example, a route that is typically used by elite riders due to its challenging nature might not be presented to a user who is inexperienced or whose past performance is deemed to be below the skill level needed to finish or enjoy the ride. A route that is scenic between two points may be presented to a rider wanting a nice recreational ride, whereas a rider who is training and wants to ride between the same two points may be presented with another route that has hills, turns or other features but which is not considered scenic. Embodiments may further consider the number of cyclists on a route (or projected to be on a route). If several (independent) riders want to ride the same route, a controller may communicate with a central server to determine the number of riders anticipated to be riding the route and accordingly present alternate routes to avoid possible congestion or may suggest a delayed starting time. Alternatively, the controller, upon determining that multiple riders are wanting to ride the same route, may communicate with the other controllers (either directly or via a central server or other computing device associated with the other riders) to suggest a single time for a single group or suggest multiple start times to group riders having a similar skill level, etc.

The processes of storing data, analyzing data and communication may be performed by computer instructions. A set of computer instructions may be stored in memory accessible by a controller associated with or integrated with a bicycle, may be stored in a computing device communicatively coupled to a controller, may be stored in a set of servers communicatively coupled to a controller, or some combination thereof.

FIG. 1 depicts a high level architectural diagram, illustrating a system for providing communications among controllers 145 (such as controllers 145-1, 145-2, and 145-3), associated with bicycles 140, client computing devices 150, third party servers 160 and central server 110.

In some embodiments, user information may be stored locally, such as in a controller integrated with a bicycle or a user device associated with a user, or may be stored as an agent or module in a central server 110. As depicted in FIG. 1, controller 145-1 may be integrated into a hub (or other component) of bicycle 140-1, controller 145-2 may be coupled to the handlebar (or other frame member) of bicycle 140-2, and controller 145-3 may be attachable/detachable to enable use with any of bicycles 140-3 to 140-N. In some embodiments, controller 145 may store information about one or more riders, routes, previous rides, or other information. For example, controller 145 may store a set of training programs and a set of user preferences including personal records (PRs), goals, etc., for a user. Each time the user interacts with controller 145, the user may be presented with this personalized information. Storing information as part of an agent or module may allow a user to take advantage of the functionality of a web bike using different bicycles.

In some embodiments, controller 145 has limited memory, processing power or functionality, but can communicate with central server 110, client computing devices 150 or third party servers 160 which have memory, processing power or functionality. In these scenarios, controller 145 may provide an interface between a user and various analytical tools. For example, in some embodiments, controller 145 may be communicatively coupled to central server 110, client computing devices 150, or third party servers 160 via network 130. Communicatively coupling controllers 145 to one or more of central server 110, client computing device 150, or third party servers 160 may vary. For example, during a ride, a user might want to be in constant contact with a coach or trainer using client computing device 150, and so controller 145 may be communicatively coupled to client computing device 150 such that data is continuously being streamed, packetized, or otherwise sent to client computing device 150. It should be noted that there may be more than one person wanting to receive continuous information about a user, and these people might be using different computing devices. Accordingly, embodiments may send information that allows a person using a first client computing device 150-1 to receive and process in a first format (e.g., streaming) or containing a first set of information, allows a second person using a second client computing device 150-2 to receive and process in a second format (e.g., packetized or aggregated) or containing a second set of information, and so forth.

Central server 110 may refer to a server or set of servers with the capability to access any information including user information, bicycle or equipment information, and route information, for all users, bicycles and equipment, and routes.

Client computing devices 150 may refer to any device capable of accessing selected information including user information, bicycle or equipment information, and route information for a user or selected group of users. In some embodiments, client computing device 150 may have memory coupled to a processor and storing a set of instructions such that client computing device 150 is able to perform processes including, for example, data collection, data analysis, data aggregation, data presentation, and coordination among two or more controllers. In other embodiments, client computing device 150 may have sufficient functionality to interact with central server 110, controller 145 or third party servers 160 to communicate information including data and display or otherwise present information to a user. Information can be sent to a first client device (e.g. 150-1) such that a user is able to access the information in real time. Information can also be sent to a second client device (e.g., 150-2) such that a trainer/coach is able to access the information at a later time. The information may be sent in real time or the data can be sent at a preselected time, at the request of a user of client computing device 150, etc. Client computing devices 150 may keep track of warranty information, communicate with third party servers 160 to schedule service with a third party vendor, communicate with central server 110 to locate third party service providers, or communicate with other client computing devices 150. In some embodiments, client computing devices 150 may receive information about a CVT used on the bicycle or vehicle. The information may include information about the speed ratio, torque ratio or other parameter of the CVT. In some embodiments utilizing a CVT having a plurality of tiltable balls interposed between first and second traction rings, information may include a tilt angle for the plurality of balls. Other parameters of a CVT may be communicated to client computing devices 150 as well.

Third party servers 160 may refer to any device capable of accessing, receiving or otherwise obtaining information from central server 110, controllers 145, client computing devices 150 or other third party servers 160. Information obtained by third party servers 160 may include user information, bicycle or equipment performance information and route information. Information sent to any of third party servers 160 may depend on the type of third party. A third party server 160 may be associated with a bicycle or component manufacturer. Information sent to that third party server 160 may include information about the particular equipment in use. In some embodiments, third party servers 160 may receive information about a CVT used on the bicycle or vehicle. The information may include information about the speed ratio, torque ratio or other parameter of the CVT. In some embodiments utilizing a CVT having a plurality of tiltable balls interposed between first and second traction rings, information may include a tilt angle for the plurality of balls. Other parameters of a CVT may be communicated to third party servers as well.

Other information sent to that third party server 160 may include the route(s) on which the equipment has been used and non-specific information about the user (e.g., gender, weight, age, but not name). A third party server 160 may be associated with a route. For example, a tourism board may want to know what restaurants users prefer, which hotels they stay in, etc. Information sent to a third party server 160 associated with a route may include non-specific information about the users (e.g., gender, age) and may include information about locations at which a user stopped, as well as the time spent at these locations. The time spent at a location may be indicative of a user stopping at a scenic point, a restaurant, a bed and breakfast, etc. Using this information, a third party server 160 associated with the route may, upon determining that a user wants to use all or a portion of the route, provide recommendations, offer deals or coupons, schedule service for the bicycle, keep track of warranty information, etc.

Information sent to third party servers 160 may be controlled or determined by a set of rules or guidelines stored in central server 110. In some embodiments, central server 110 may control all information, such that information obtained by third party servers 160 is received from central server 110. In some embodiments, central server 110 may communicate an instruction, passcode, key, or the like to controller(s) 145, client computing devices 150 or third party servers 160 such that information meeting a predetermined criteria can be received by third party servers 160. In these embodiments, information does not need to pass through central server 110, but instead may go directly to controller 145, client computing device 150, or third party servers 160, or a copy of the information sent to central server 110 may also be forwarded to other controllers 145, client computing devices 150 or third party servers 160.

Figure 2:
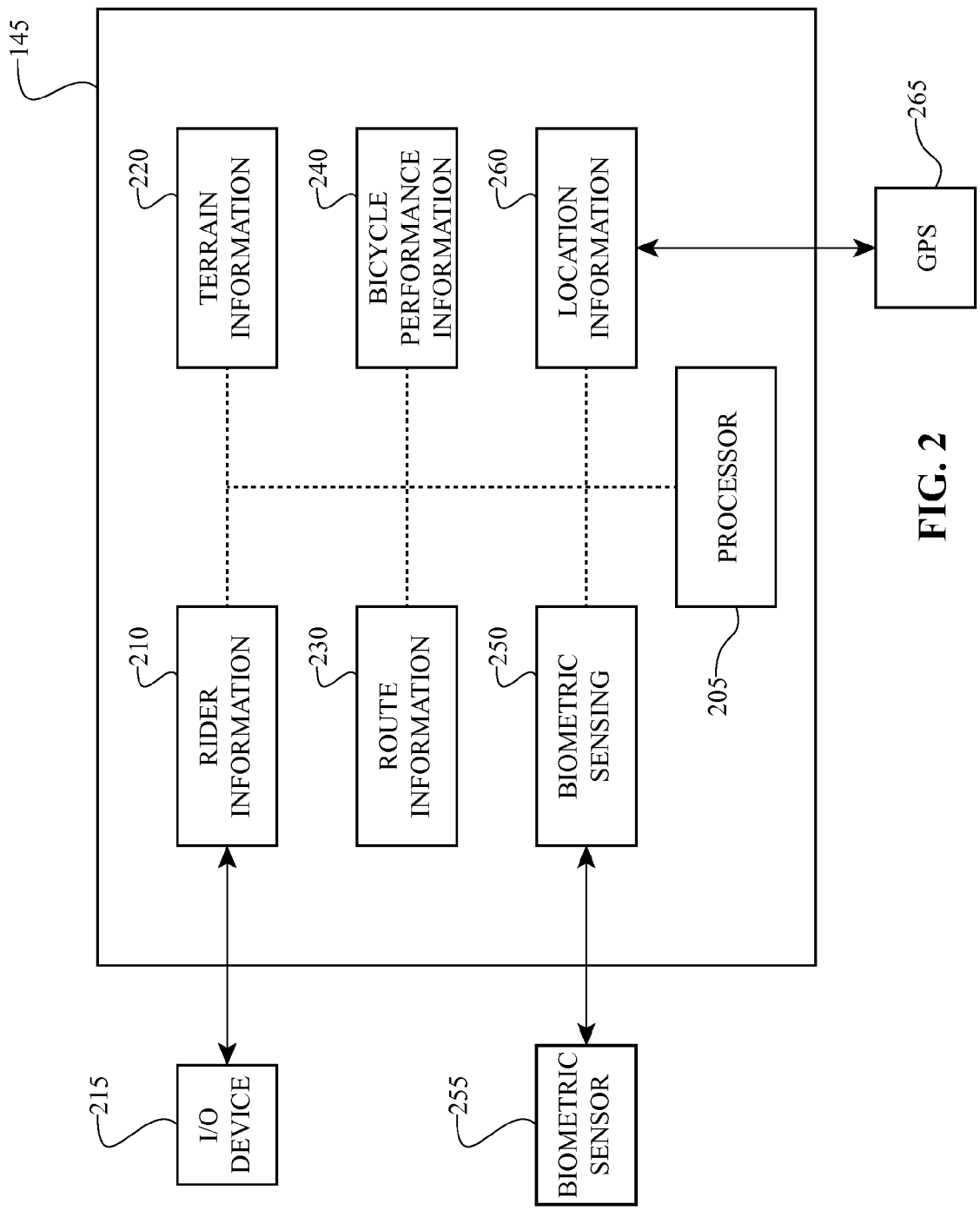
FIG. 2 depicts a block diagram illustrating components useful for communications to and from a web-enabled bicycle according to another embodiment.

FIG. 2 depicts a block diagram illustrating one embodiment of a controller 145 that includes various hardware, firmware or modules useful for communicating information from users associated with bicycles 140 to central server 110, client computing devices 150 or third party servers 160. Controller 145 may include rider information module 210, terrain information module 220, route information module 230, bicycle information module 240, biometric sensing module 250 and location information module 260. The controller 145 also includes a processor 205 and a non-transitory memory (not illustrated) storing a set of instructions executable by the processor 205 to, for example, retrieve information from the memory, store information to the memory, and communicate with one or more of rider information module 210, terrain information module 220, route information module 230, bicycle information module 240, biometric sensing module 250, and location information module 260.

Rider information may be obtained by controller 145. For example, rider information module 210 on controller 145 may establish communication between controller 145 and input/output (I/O) device 215 such that when a user interacts with I/O device 215, information is received from the user, appropriate information is presented to the user based on the received information. In some embodiments, controller 145 may present a graphical user interface (GUI) to a user. The user may be allowed to enter information in various ways. For example, manual entry (e.g., a keyboard) may allow a user to enter information, a port which allows a thumb drive or other media device storing information to be connected, or other I/O methods. In some embodiments, controller 145 may be configured to automatically obtain rider information. For example, rider information module 210 may communicate with sensors (e.g., fingerprint sensors) or other equipment (e.g., a device using near field communication) and compare that information with user information previously stored to determine an identity of a user. In some embodiments, rider information module 210 may gather information, analyze the information, and communicate a summary of the information to controller 145, which may reduce processing requirements of controller 145.

Terrain information may be obtained by controller 145. For example, terrain information module 220 on controller 145 may retrieve maps from memory or communicate with server 110 or third party servers 160 to obtain maps or other terrain information. Terrain information module 220 may communicate with location information module 260 to obtain location information and use that location information to determine an associated terrain.

Route information may be obtained by controller 145. For example, route information module 230 on controller 145 may communicate with rider information module 210 to get rider information, communicate with location information module 260 to get location information, communicate with terrain information module 220 to get terrain information, and may communicate with server 110, third party servers 160, or client computing devices 150 to get additional information necessary to plan a route. In some embodiments, route information module 230 may only be functional at selected times. For example, if route planning is coordinated through client computing device 150 (which may indicate the route is based on instructions by a coach), route information module 230 may determine the route and then power down, hibernate, etc., because there is only one route. If route information module 230 is being used to plan a route for a commute to work, route planning module 230 may remain on throughout the ride in the event there are detours, traffic slowdowns or other problems such that the rider might want or need to change a route after the ride has started.

Controller 145 may communicate with sensors to determine information about a transmission. Information may include speed ratio, a tilt angle, a rate of change of a tilt angle, or some other information related to the performance of a transmission on the bicycle. In some embodiments, bicycle information module 240 may be configured to periodically communicate with sensors to receive signals and compare these signals with signals stored in memory. In some embodiments, bicycle information module 240 may gather information, analyze the information, and communicate a summary of the information to controller 145, which may reduce processing requirements of controller 145.

Controller 145 may communicate with a heart rate monitor, a respiration rate sensor, thermometer, or other biometric sensor 255 to obtain information for controller 145. In some embodiments, biometric sensing module 250 may be configured to communicate with a heart rate sensor, a respiration rate sensor or the like at a predetermined rate to gather information. In some embodiments, biometric sensing module 250 may gather information, analyze the information, and communicate a summary of the information to controller 145, which may reduce processing requirements of controller 145.

Controller 145 may communicate with GPS device 265 or include a GPS receiver to obtain location information. In some embodiments, location information module 260 may gather information, analyze the information, and communicate a summary of the information to controller 145, which may reduce processing requirements of controller 145.

Information received by controller 145 (including and information received from any of modules 210, 220, 230, 240, 250 and 260) may be correlated with other information. For example, terrain information may be correlated with location information to determine the slope along a route. Controller 145 may send this information to central server 110, other controllers 145, client computing device 150 or third party server 160.

Information sent to central server 110, other controllers 145, client computing device 150, or third party servers 160 may be analyzed, aggregated, segmented or otherwise processed for additional information. Information may be analyzed as it is received or may be stored for analysis at some later time.

In some embodiments, information may be streamed to central server 110 or may be packetized. Analysis of the information may be performed on a particular packet of information, a segment of a stream of information, or some other portion of the information. Analysis of rider information sent to central server 110 may be used to determine performance capabilities of the rider as well as categories of riders, including those riders who do not compete, do not follow set routes, ride infrequently, or who otherwise do not fall into a particular category. Analysis of route information sent to central server 110 may be used to determine, for example, a difficulty of the route, may be used to identify one or more complementary routes or alternate routes. Analysis of bicycle or equipment information may be used to determine performance characteristics of the bicycle or components thereon.

Aggregation may include gathering information of varying degrees of granularity. For example, aggregation may include receiving information about a particular rider on a particular route on a particular bicycle, and may also include information about the average speed of a group of riders, the average speed of a mountain bicycle on flat terrain, etc. Aggregation may include passively receiving information from a source or actively requesting information. Aggregation may be performed as information is received, or may be performed after some initial analysis. Aggregation may include stripping any information which could associate the information to a particular rider, route or piece of equipment. Information may be aggregated as a singular set, or may be aggregated based on time, location, gender or other criteria. Aggregated information may be stored, such as in a repository coupled to central server 110.

An issue with many existing data collection systems is the rudimentary nature in which data is diluted down to a generic output of elapsed time, average heart rate and average speed. Embodiments disclosed herein may provide greater analyses for better understanding of a ride. Analysis of route information may include segmentation. Segmentation of information may include separating information into two or more parts or segments according to some criteria other than time (i.e., laps). Segmentation may occur as information is received into central server 110 or may occur when information is requested from central server 110. FIGS. 3A-3F depict tables or graphs, illustrating techniques for segmenting information.

FIG. 3A depicts table 300-1 for storing information about a set of riders. Column 310 may include a rider identification number. Column 320 may include information about a rider, such as age. Column 330 may include information such as rider gender. Column 340 may include information such as skill level, experience, or some other criteria. Column 350 may include additional information, such as whether the rider is a recreational rider (R), a sport rider (S), a commuter (C), tours (T), or is rehabilitating an injury (M). Table 300-1 is an example of information which may be stored in memory associated with central server 110. Table 300-1 or portions thereof may be shared or communicated to controllers 145, client computing devices 150, or third party servers 160. As an example, a rider associated with rider ID 10010 may be 22 years old, Male, Skill Level 2, and may be a Sport rider. Information about the rider associated with rider ID 10010 may be forwarded to a third party server 160 associated with equipment specialized for sport riders, equipment for a rider with a skill level of 2, equipment or apparel for male riders, equipment or apparel popular among 22 year old riders, etc.

FIG. 3B depicts table 300-2 for storing information about a particular rider. Table 300-2 may store information such as the user's resting heart rate or other biometric information, a maximum speed the user has achieved, a maximum torque the user has achieved, a maximum distance the user has traveled, and may also include information such as maximum pedal speed (RPM) achieved on a ride, distance covered (total), and other information specific to that user. As an example, a rider associated with rider ID 10010 may have a resting heart rate of 54 beats per minute (BPM), have achieved a top speed of 56 kilometers per hour (kph), may have generated maximum torque of 43 newton—meters (Nm), may have pedaled a maximum 202 km in a single ride, may have achieved a maximum pedal speed of 154 revolutions per minute (rpm), and may have traveled a total of 34032 kilometers (km). Access to information found in table 300-2 by client computing device 150 may enable a coach to evaluate the training of a rider, determine an appropriate bicycle for the rider, etc. For example, a coach might want to know at what rotational speed (cadence) the rider developed the most power. Access to information found in table 300-2 by third party server 160 may allow an equipment manufacturer to evaluate a warranty claim, allow a manufacturer to determine product limits for upcoming versions or warranty claims, allow manufacturers to compare product performance, allow a manufacturer to market a product to a particular group of users, etc.

FIG. 3C depicts table 300-3 for storing information about rides completed by a particular rider. Each row may correspond to a particular route. Columns may include information about distance covered and the time needed to complete the route. In addition, table 300-3 may include a user rating for the route, a slope for the route, average speed, average torque, maximum heart rate and average heart rate or some other biometric, and the like. For example, rider 10010 may have completed four rides. The distance and time for each ride may be automatically recorded (or communicated) by controller 145. A user rating may be provided by rider 10010 and recorded (or communicated) by controller 145. A slope may be determined based upon the distance and time in comparison with the user rating. Thus, as more riders ride the same route, more information may be gathered and determined, improving rides for subsequent riders. Access to table 300-3 by client computing device 150 may allow a user (e.g., a coach or trainer) to evaluate a rider's performance relative to routes having a certain profile. Access to table 300-3 by third party servers 160 may allow a third party to evaluate warranty claims, predict service intervals, target specific groups or types of riders for deals on lodging, service, equipment, etc.

FIG. 3D depicts table 300-4 for storing information about a particular route. Each row may correspond to a particular instance of the route being ridden. For example, a route may be ridden by a first person on a road bike and a second person on a mountain bike, or a route may be defined one way when ridden in summer and defined an alternate way when ridden during winter, etc. Columns may contain information such as the route distance, a time needed to complete the route, a maximum incline (ascent) along the route, a maximum decline (or descent) along the route, average number of riders/day, total riders who have ridden the route, peak number of riders (in-season), peak number of riders (off-season), average number of riders (in-season), average number of riders (off-season), average number of riders (per month), etc. Columns may also include information corresponding to bicycle performance along the route. Table 300-4 storing information about a route for users of bicycles having continuously variable transmissions (CVTs) may include columns storing information about the maximum tilt angle of a tiltable planet axle. As depicted in FIG. 3D, a route having Route ID 4283 may cover 35 km, may have a maximum incline of 7% and a maximum decline of 3%, may have been ridden by 6371 riders, and an alternate route may be Route ID 4567. Additionally, table 300-4 may be used to record information about bicycle performance. For example, table 300-4 may include information corresponding to the operating parameters of a CVT, such as that a maximum tilt angle for a ball-type CVT was 13 degrees. Access to table 300-4 by a third party server 160 associated with a manufacturer may allow the manufacturer to identify preferred operating ranges for future products, evaluate a warranty claim, etc. Access to table 300-4 by a client computing device 150 may allow a coach to evaluate training performance, set new goals, etc. For example, if a rider with a continuously variable transmission rides route 4283 and records a maximum tilt angle of 17 degrees, that information may be communicated to central server 110, third party server 160 or client computing device 150 for further analysis of the route, the rider's performance, equipment, etc.

Figures 3E, 3F:
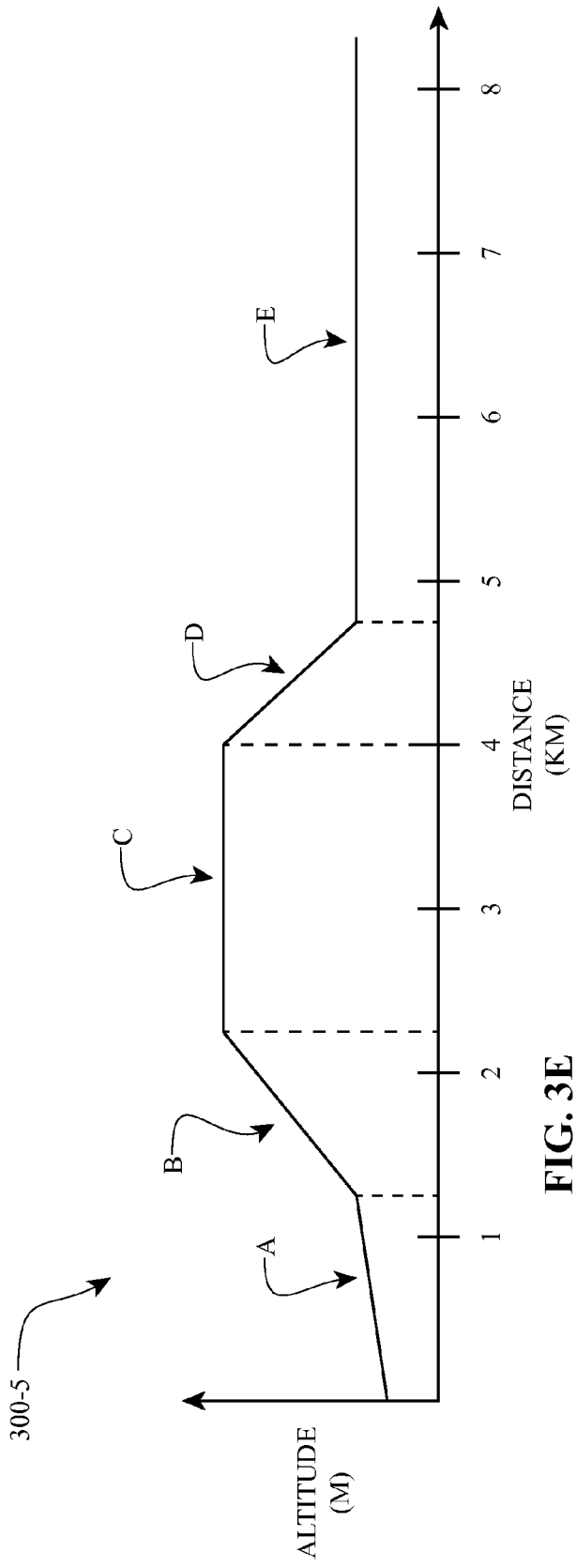

FIG. 3E depicts graph 300-5 associated with information for a route. A route may be divided into segments. The number of segments and the length of each segment may be based on predetermined criteria. In some embodiments, a segment may be based upon a number of wheel rotations of a bicycle (e.g., every 500 wheel rotations), based upon a slope change (e.g. 1-3 degrees, 4-6 degrees, 7-8 degrees, 9+ degrees), based upon an altitude change (e.g., a new segment every 50 m of elevation change), or some other criteria. Graph 300-5 depicts an 8 km route divided into five segments, in which each segment is determined based on a slope or incline. As shown in FIG. 3E, Segment A has a first slope (slight incline), Segment B has a second slope (steeper incline), Segment C is generally flat, Segment D has a third slope (decline), and Segment E is generally flat. Thus, even though the route has only a slight slope (slight incline) from start to finish, embodiments may segment the route to get a better understanding of how riders and equipment are performing along the route.

FIG. 3F depicts table 300-6 for storing information about a route, for example a route 1234. Storing information about a route may include segmenting the route into a plurality of segments (also commonly referred to as "legs"). Table 300-6 depicts information stored for the route segments depicted in FIG. 3E. Each row may be used to store information about a particular segment. Columns may store information such as a Segment identification number, a time needed to complete the segment and an average slope of the segment. For users of bicycles with CVTs, embodiment may further store information such as an average tilt angle, a maximum tilt angle, a maximum tilt angle per revolution, pedal speed (including average RPM, maximum RPM, the amount of battery power needed to complete the ride, the maximum power draw, the average power draw, the percentage of the route over which the power was drawn, the differential in power drawn when a rider's left leg was at a specific angle as compared to the power drawn when the rider's right leg was at a specific angle, etc.), and the like.

To aid in further understanding the concepts described herein, an example is provided. A user purchases a bicycle with a selected drivetrain, wheels, frame, and other equipment. The user registers with central server 110, including providing information about his/her preferences and information about the bicycle including any components. In some embodiments, controller 145 may contain functionality to detect or determine information about one or more components and automatically communicate this information to central server 110. Central server 110 may communicate warranty information to one or more third party servers 160. Each time the user rides the bicycle, controller 145 may communicate with central server 110, client computing device 150 or third party server 160 to get information about a route, get training goals, determine stopping points along a route, etc. Controller 145 then monitors the rider's performance along the route and sends selected information about the performance to central server 110, client computing device 150 or third party server 160. Information sent to client computing device 150 is sent in real time to enable a coach to see how the rider is performing or how the equipment is performing. Information sent to central server 110 includes information about the route, the rider, and the bicycle. The rider or coach/trainer may further receive information indicating the bicycle needs service, may receive an evaluation of the rider's performance (either with respect to other rides the rider has completed along the same route, comparable rides along other routes, rides by other riders along the same route, or rides by other riders along comparable routes), or other information. Central server 110 and/or third party servers 160 may analyze data received from controller 145 to evaluate the performance of the bicycle or components. Information may be communicated to client computing device 150 or controller 145 to adjust training goals for the next ride. The process is repeated each time the user rides the bicycle.

Figure 4:
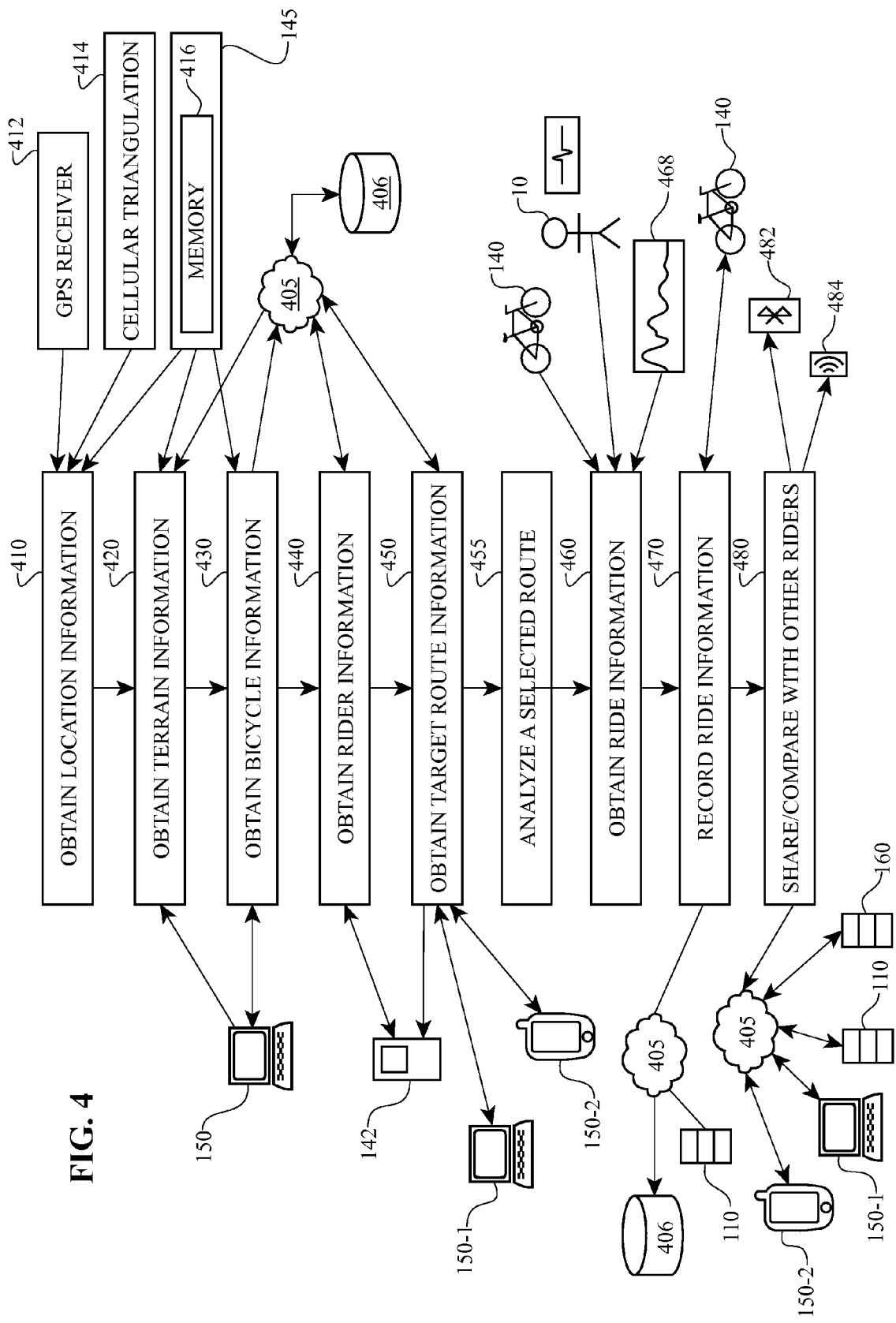
FIG. 4 depicts a flow diagram, illustrating one embodiment of a method for route planning with a web-enabled bicycle.

FIG. 4 depicts a flow diagram illustrating route planning for use in a control scheme for a bicycle. The control scheme may be used with a continuously variable transmission (CVT), such as a continuously variable planetary (CVP) transmission, which may be coupled to a motor. Route planning may include using location information, a topographic map or other source of terrain information, and bicycle information to identify roads and trails to utilize or roads and trails to avoid. Embodiments of controllers described herein, such as controller 145, can implement route planning in the manner described with reference to FIG. 4.

In step 410, location information may be obtained by a controller (such as controller 145) from a GPS receiver 412, a cellular triangulation system 414, or some other navigation system, or memory 416 and may include elevation, temperature, sunrise time, sunset time, humidity, wind speed, wind direction, dew point or other information associated with a location.

In step 420, terrain information may be obtained. Information may be obtained by central server 110 and communicated to controller 145, client computing device 150 or third party server 160, or may be obtained directly by a controller, such as controller 145 depicted in FIG. 1. Terrain information includes information about elevation, including changes in elevation (e.g., grade). Terrain information may include a topographic map stored in memory 416 integrated with the bicycle or obtained by communicating with a terrain information database 406 over a network 405, and may further include maximum elevation, minimum elevation, average elevation, grade, and may also include information about roads, paths or trails including intersections, railroad crossings, school zones, construction zones, low water crossings, etc.

In step 430, bicycle information may be obtained, such as by central server 110 coupled to controller 145 described above. Bicycle information may be stored in memory 416 or may be obtained by communicating with central server 110, a client computing device 150 or third party server 160 over a network, such as network 405, and may include information including a range of speed ratios, a range of torque ratios, a range of power ratios, a battery charge level, battery maximum current level, average battery current draw, maximum motor power output and average motor power output. In some embodiments, controller 145 or central server 110 may store a data structure correlating tilt angles for a CVT with speed ratios, torque ratios or power ratios.

In step 440, rider information may be obtained from user interface 142, from database 406 communicatively coupled via network 405, or from client computer 150. Additionally, sensors mounted on a bike may determine additional information about the rider, including weight, temperature, heart rate and respiratory rate. Rider information may include information about a preferred cadence or range of cadence.

In step 450, target route information may be obtained by controller 145. A route may be input by a user via user interface 142, may be obtained from database 406 via network 405 or may be obtained from friends or other users. A target route may be determined based on user criteria, and may be specific or open. A route input by a user may be unique to the user or known, entered manually, selected from a predetermined or preloaded set, or downloaded. A route may be unique to the rider or may be known, such as a route covered in an established cycling competition. Examples of open routes based on user input may involve the user entering a starting point and a distance, a user entering a time and an ending point, a loop and a number of laps, or other criteria. Embodiments may use criteria and determine a route accordingly. The route may be selected to end at the same location as the starting point or at some other point. Other examples of user criteria may include a caloric goal, heart rate or some other biometric parameter.

In step 455, analysis of a route over which the user intends to ride may be performed by one or more of controller 145, central server 110, client computing device 150 or third party server 160 to derive an actual route. Analysis of a route may determine that the selected route is not ideal for the user. For example, a user may enter specific goals. Central server 110 or client computing device 150 may determine that a road, trail or other route may be longer, shorter, have a greater elevation change, have a lesser elevation change, may have steeper grades, may be flatter, or otherwise have an undesirable profile for the user to achieve their goal. Third party server 160 may determine that a battery coupled to an electric motor on bicycle 140 does not have enough power to last the entire route. An analysis may be performed of the battery and CVT (and motor if installed), in embodiments of bikes having these components. The analysis may determine that operating the CVT in a range ideal for the rider will draw a certain average power level or maximum power level. The results of the analysis may be compared with warranty information or compared with actual battery levels, etc., to determine if the ride is acceptable from a warranty perspective or even possible from a rider perspective. Embodiments disclosed herein may analyze user input regarding a preferred route profile, analyze the actual terrain to be encountered on the route, analyze one or more performance characteristics of a bicycle, and utilize this information to adjust a performance characteristic of the bicycle to more closely match the desired profile.

As a specific example, a user may want to train on hills to improve climbing skills, but live in an area with generally flat terrain. Thus, even if the user inputs "hill climbing" in a user interface, bicycles are generally unable to fulfill this goal. Embodiments disclosed herein may take into account the user criteria for wanting hills, analyze the actual terrain to determine that hills are not present, gather information about a bicycle transmission, and determine how to adjust the transmission to compensate for the flat terrain and create a sense of hills. Conversely, if a rider lives in a hilly area and wants to ride a bicycle on flat terrain, embodiments may adjust the transmission to compensate for the hilly terrain. In some embodiments, a bicycle having a CVT may change the CVT to require more torque from a rider to simulate a hill. In some embodiments, a bicycle having a CVT with a motor/generator and a battery may simulate hills by configuring the CVT into a charging mode such that a hill is simulated by the rider charging the battery via the CVT. In some embodiments, a bicycle having a CVT may use a motor to add power such that flat terrain is simulated to the rider. Furthermore, embodiments may utilize anticipatory shifting such that a rider has the sensation of riding the selected route even if the route does not match the actual route.

Other configurations are possible to ensure the rider is able to achieve a goal. For example, a rider may select a mode based on weight loss, increasing VO2max, increasing endurance, increasing speed or sprinting ability, or the like. To achieve these goals, embodiments disclosed herein may determine the actual terrain based on GPS or other location information in combination with terrain information, identify a route, determine the profile of the selected route, determine the difference between the actual profile and the selected profile, and adjust a performance characteristic of the bicycle to achieve the goal. As an example regarding weight loss, embodiments may determine a route based on an ideal or optimized period for exercise (e.g., 30 minutes), determine an ideal cadence (e.g., between 60-80 rpm) or heart rate (e.g., less than 120 bpm) or determine a profile for the route.

The method or steps described in relation to FIG. 4 may be performed by a controller having a memory for storing information, a set of computer instructions, and a processor configured for executing the instructions and capable of retrieving information from memory, storing information to the memory, and further capable of communicating with database 406, user interface 142, client computer 150, and other computers and computing devices over wired or wireless connections.

In step 460, rider information, location information, terrain information and bicycle information are obtained. In some embodiments, controller 145 may gather information about bicycle 140, user 10, or route 468. In some embodiments, central server 110, client computing device 150 or third party server 160 may send information to controller 145. A route may be based on the location of the bicycle in conjunction with the terrain information. A control scheme or performance map may be initiated for controlling the transmission based on the rider information or the bicycle information in conjunction with the terrain information. As the rider begins riding the route, controller 145 may control shifting of the transmission or motor to achieve the actual route. Embodiments may adjust a speed ratio according to the control scheme or performance map to ensure the rider maintains his/her performance throughout the ride. A control scheme may include anticipatory shifting, or a performance map may be based in part on anticipatory shifting. Controller 145 may also control a motor. Some embodiments may utilize anticipatory shifting and motor control to ensure the rider achieves the goal.

Throughout the ride, in step 470, controller 145 may record information or communicate information to central server 110, client computing device 150 or third party server 160. Information may include information about the route, the weather, the bicycle performance or rider performance. Information about the route may include the distance traveled, any elevation changes, the grade of any road or trail, or the roughness or smoothness of the road or path. Bicycle information and rider information may include how many times the speed ratio of the transmission changed, what range of speed ratios was used during the ride, the median speed ratio, the mean speed ratio, the modes of speed ratios, the maximum torque experienced by the transmission, the average torque experienced by the transmission, the range of torques experienced by the transmission, the maximum power generated by the rider, the maximum power generated by the rider, the average power exerted by the rider, the maximum torque applied by the rider, the average torque applied by the rider, or the like. Embodiments may further analyze the bicycle information or the rider information in conjunction with the route information. In doing so, embodiments may, for example, determine at what cadence the rider generates the maximum power, and may also determine what grade of road the rider is able to generate the maximum power.

Cyclists frequently discuss rides with other cyclists, including times, routes and distances. In step 480, cyclists can take a step further and compare effort, experience, or some performance characteristic, either directly with other cyclists over Bluetooth® or some other near-field communication 482 or 484, via downloading information via network 405 to computer 150-1 or 150-2, or by allowing others to download information stored in central server 110 or third party servers 160. A first rider may ride a first bicycle along a first route having a first profile and a controller may record information about the route, the weather, rider information, bicycle information, or other information. Bicycle 140 may have a plurality of sensors communicatively coupled to controller 145. The sensors may include sensors for detecting a bicycle speed, a wheel speed, an input speed to a transmission, an output speed from the transmission or a speed ratio of the transmission. Other sensors communicatively coupled to controller 145 may include a thermometer, a barometer, or some other weather sensor, or an altimeter, accelerometer or other spatial sensor.

Controller 145 is configured to execute a set of instructions to receive the signals and perform an analysis of the signals. Embodiments may normalize the information to take into account information about the route, including the elevation, temperature, wind speed, wind direction, or other information in order to record the information into a format suitable for further analysis.

The rider may share the information with another rider, such as via a file sent to a client computer 150 associated with or accessible by a second rider or downloadable by the second rider from central server 110 or third party servers 160. The file may include raw information or normalized information. The second bicycle may use the information to plan a second route. The second rider may then ride a second bike along the second route having a second profile. The second bicycle may use location information and a map of the second profile to adjust a performance characteristic of the second bicycle such that the second rider has the experience of riding the first route. The second bicycle controller may also normalize information from the second route such that the information from the first ride and the second ride can be compared. In some embodiments, the first bicycle or the second bicycle utilizes a continuously variable transmission or a transmission/motor combination.

Safety is another concern for cyclists, as accidents involving bicycles and automobiles may be fatal to any cyclist involved. A cyclist knowing his/her location on a map may adjust his/her speed or take another route. However, a cyclist in a training run may not want to stop the training run or may be unable to compensate for the interruption. Embodiments disclosed herein may alert cyclists to areas or zones of danger and help mitigate the risks. A bicycle may utilize GPS or other location information in conjunction with a topographic map or other terrain information. Embodiments disclosed herein may determine information about zones of danger and adjust a training run without requiring input from the user.

Figure 5:
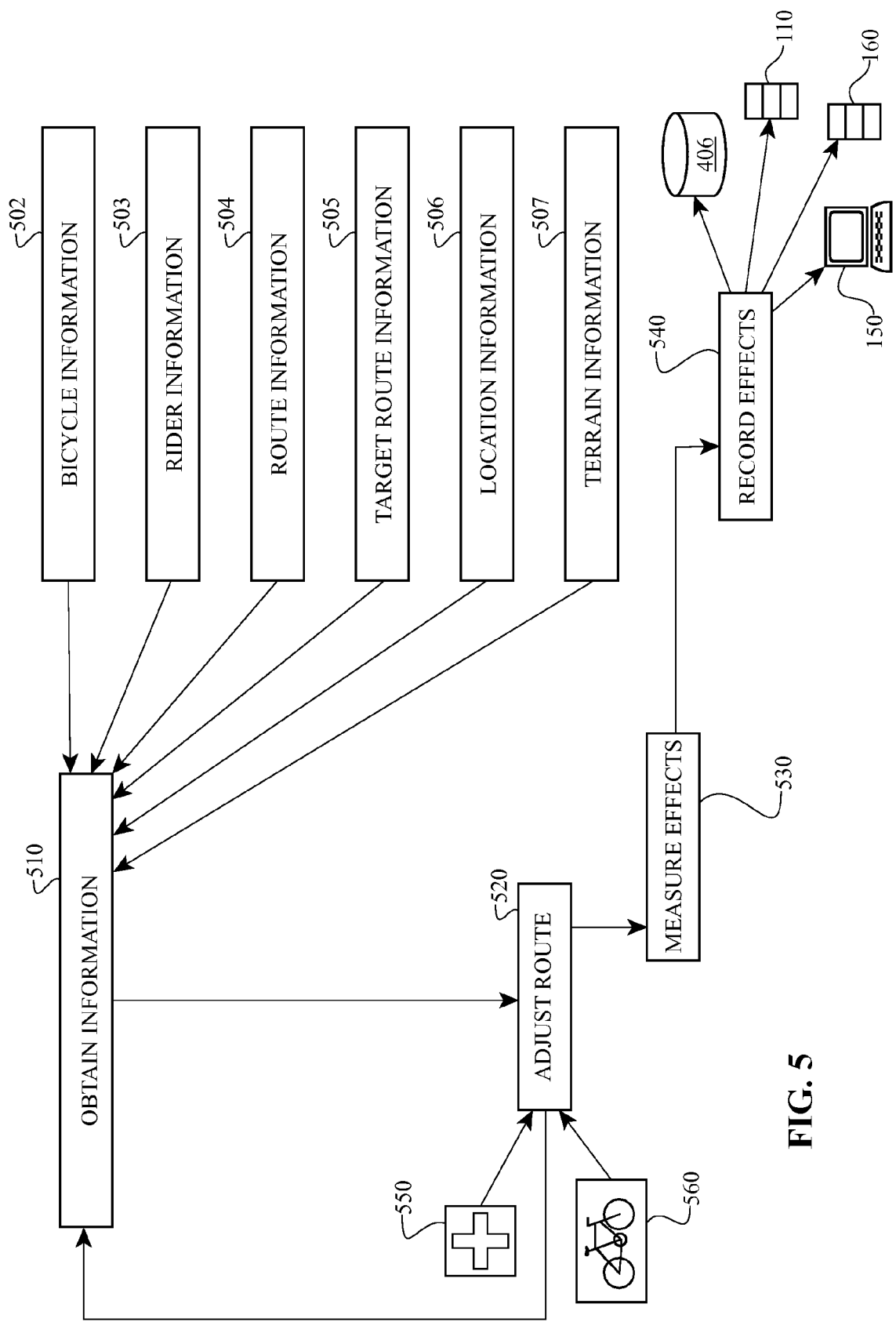
FIG. 5 depicts a flow diagram, illustrating one embodiment of a method for adjusting a control scheme or route.

FIG. 5 depicts a flow diagram illustrating one method for adjusting a control scheme or route based on location information, terrain information, rider information or bicycle information. Embodiments of controllers described herein, such as controller 145, can adjust a control scheme or route in the manner described with reference to FIG. 5. Adjusting a training run may include delaying a portion of the training run until after the cyclist has passed through a zone, shortening a portion of the training run to ensure the portion of the route is completed before reaching a zone, adjusting the transmission to a speed ratio best suited for allowing the cyclist to proceed through a zone safely, or providing power to assist the rider in passing through a zone as quickly as possible. Delaying a portion of the training run may include adjusting a gear ratio or speed ratio to a ratio that allows the cyclist to pedal faster through a zone. Shortening a portion of the training run may include increasing the resistance such that the rider expends the same amount of energy, but over a shorter distance than originally planned. Adjusting the training run may include providing a signal, alarm, or other indicator to the rider to alert them that a danger exists and that the bicycle will be adjusting the speed ratio and/or adding power to the system if needed.

Adjusting a training run may include suspending the training run based on the location of the bicycle, the speed of the bicycle, or some other criteria. Determining when to suspend automatic shifting may occur before or during a route. In step 510, controller 145 gathers bicycle information 502, rider information 503, route information 504, target route information 505, location information 506 and terrain information 507 and determines a control scheme based on an analysis of the information. In step 520, controller 145 adjusts the route or the control scheme based on rider safety 550 or bike/rider performance 560. Controller 145 may determine when to suspend automatic shifting of a transmission or motor, including how to suspend automatic shifting of a transmission or automatic operation of a motor. In step 530, controller 145 measures the effects on rider performance and bicycle performance. In step 540, the effects of the new control scheme may be recorded in database 406, communicated to central server 110, communicated to third party servers 160, or communicated to client computer 150.

As an example of how embodiments may suspend automatic shifting or a motor during a training run, if the bicycle is physically approaching an intersection, a school zone, etc., the cyclist may want or need to slow down. However, if the bicycle is in a training mode that includes hill climbing, the bicycle might be configured for a speed ratio that could result in the rider speeding through the zone, or might even try to add power using a motor. As another example, the bicycle may be physically on a downhill and the rider is just coasting or crossing an intersection, but the virtual bike is approaching the base of a steep climb and wants to apply a braking force to simulate the climb. Embodiments disclosed herein may include controller 145 configured to obtain location information, terrain information, rider information, and bicycle information. Analyzing location information, terrain information and bicycle information enables controller 145 to recognize that this is an area that is not safe and the controller may suspend the training program so as to not turbo boost the bike into the intersection, speed through the school zone, apply a braking force when the bicycle is in the middle of an intersection, in a low water crossing, on a railroad crossing, etc. Suspension of a control scheme may include maintaining the transmission at the last state before the bicycle entered a portion of the route in which anticipatory shifting is undesirable. For example, if the transmission is a continuously variable transmission, suspending the control scheme may involve preventing a plurality of tiltable balls from tilting away from a present state, may involve restricting the tilt to a few degrees, or may involve changing the tilt angle to be zero degrees. By way of comparison, if the transmission is a geared transmission, suspending a control scheme may involve prevention of gear shifting.

As mentioned above, embodiments may suspend automatic shifting of a transmission or operation of a motor before the route is started. Thus, if the actual route is expected to exceed a given distance or a specified terrain, controller 145 may select to suspend a mode for all or a portion of the route. For example, if the actual distance is large, controller 145 may determine that a motor will be unable to perform in a higher performance mode for the entire distance, and so controller 145 may suspend the higher performance mode for the entire route, a portion of the route, or restrict the extent to which the mode is enabled. Continuing with the example above, a performance mode may be saved for last few miles or last portion (e.g., percent, distance, estimated time) of route in case a rider is struggling and needs help, a performance mode may be used in first portion and gradually tapered off to make training progressively harder, a performance mode may initiate only on inclines greater than 5% grade, or the like. Other modes may be disabled (i.e., suspended for the entire route). As examples, if a route is expected to be generally flat, a "hill climbing" mode may be disabled, or if a route is purely uphill, a "battery charging" mode that utilizes power generated by the rider to charge a battery may be disabled.

As mentioned above, controller 145 may communicate or record information about a ride. This information may be used to send information about the route, the bicycle performance or the rider performance to a friend to allow the friend to simulate the route conditions and compare ride performances. Information may also be used to determine performance characteristics of the bicycle under actual operating conditions. Information obtained by controller 145 about bicycle performance may include average wheel rotation speed, maximum wheel rotation speed, median wheel rotation speed, an average transmission speed ratio, a maximum transmission speed ratio, a median transmission speed ratio, a maximum transmission torque ratio, an average transmission torque ratio, a median transmission torque ratio, a transmission speed error, a transmission torque error, the total number of changes in an encoder position, the average number of changes in an encoder position, the maximum number of changes in encoder positions per distance, the average number of changes in encoder position per distance, the maximum change in encoder position for each change in terrain, the average change in encoder position for each change in terrain, efficiency, or the like. Information about the rider may include maximum power generated, average power generated, time seated, time standing, heart rate, respiration rate, and the like. Controller 145 may collect this information directly or indirectly. Direct collection may occur through the use of sensors positioned either externally or internally to other components. Indirect collection may occur by using signals from selected sensors and deriving other parameters based on mathematical relationships.

Information collected by controller 145 may be communicated in real time to another computer or server, or information may be stored for later communication and processing by a server or computer operatively coupled to bicycle 140. Information may be processed to identify variations in riding techniques, and may also reveal variations in manufacturing processes, vendor products, processes, etc. For example, if the average number of changes in encoder position per wheel rotation is 100 and information from a bicycle indicates it is making 125 changes per wheel rotation, that difference could be an indication that a spacing, angle, or other tolerance is too small, there is excessive wear on an axle, or a sensor is faulty, etc. If the maximum encoder position for a bicycle indicates a maximum ball axle angle is 50 degrees and the maximum encoder position should indicate only 45 degrees, that difference could indicate that a tolerance is too loose, there is excessive wear on a ball, the calibration is faulty, etc. Thus, as bicycle 140 is operating, embodiments may utilize controller 145 to record values for parameters and use these values to quantify operation of bicycle 140. These values can be normalized for universal comparison with other bicycles operating in various environments.

Embodiments allow users to automatically communicate information with other riders. Controller 145 allows a user to input information about a route, a training run, and other information. Controller 145 is able to store this information in order to plan a route and control a transmission through the route, and also able to send information about the route, the training run, etc., in real time. The user may input information such as an intended route, an estimated time to start the route, an estimated time to finish the route, emergency contact information, the user's fitness level, the weather, etc. Controller 145 may send this information to another rider directly, or may send the information to central server 110, client computing device 150 or third party server 160 which can then forward the information or store the information for download by another rider. Controller 145 may also add information to the information being sent. Added information may include, but is not limited to, position information, terrain information, weather information, bicycle information. As the rider progresses along the route, embodiments may update the information sent to others, or may record the information and send all the information after completion of the route. Updating and sending information while the route is being ridden may encourage others to join, allow a supporter to watch or meet them at any given point along the route or allow a coach or trainer to assess how the cyclist is performing. Information sent after the route has been completed may be analyzed to assess how a training program is progressing, determine ideal gear ratios for different terrain, get a more accurate determination of VO2max and other human performance parameters, or the like.

In addition to recording or transmitting information about the rider or the route, embodiments may record or transmit information about bicycle performance. Bicycle information may be obtained by sampling based on time, changes in the bicycle performance, changes in rider performance, or some other criteria. For example, bicycle information may be sampled every time there is a 2 rpm change in cadence, every 0.5 seconds, every 1 meter of change in terrain, every 5 wheel rotations, etc. This bicycle information may be correlated with terrain information, weather information, or some other factor to normalize the information. For example, if a first bicycle is travelling at 20 kph up a 2% grade hill and a friend on a second bicycle is travelling up a 2.2% grade at 19 kph, embodiments may normalize either or both speeds to a standardized speed, power, etc. Continuing on, if both bicycles achieve the same speed on equal downhill portions, embodiments may compare the information and determine that one rider is in better physical condition. However, if one bicycle is slower on the downhill as well, embodiments may compare the information and determine that one of the bicycles has more friction, which could be the result of low tire pressure, a flat tire, a chain needing replacement, or some alignment or servicing condition of the transmission.

In some embodiments, a combination of rider information and bicycle information may be collected. For example, monitoring the shift position of a CVP, the shifting speed, the shift timing history, or the history of different shift positions may be combined to determine that a rider rode 10 minutes in 240% overdrive, then 5 minutes in 60% underdrive, etc.

Bicycles may communicate with nearby bicycles and other vehicles using Wi-Fi, Bluetooth® or other communications protocols. Advantageously, bicycles 140 being able to communicate directly with other bicycles 140 allows riders to concentrate on other tasks. Information communicated between bicycles 140 may include route information, rider information, or bicycle information.

Route information may include information about how far into a route a rider has progressed, how much farther the rider is planning to ride to complete a route or a portion thereof, the actual route (i.e., roads, trails, legs, rest stops, etc.).

Rider information may include information about the condition or experience of the rider, the power being generated by the rider, the energy being expended by the rider, or other performance information. Analysis by one or more controllers 145 in a plurality of bicycles 140 may use this information to determine which rider should be in front of a pack of riders, which riders should try to draft off other cyclists, a spacing between bicycles for optimum riding and training, etc.

Bicycle information may include information described above. Analysis by one or more controllers 145 in a plurality of bicycles 140 may use this information to determine which bicycle 140 has the least overall resistance, which bicycle 140 is best for climbs, which bicycle 140 is best for downhill riding, etc. In some embodiments a single controller 145 performs all analyses. In some embodiments, a plurality of controllers 145 utilizes distributed computing processes to divide the analyses.

Combining the route information, rider information and bicycle information and analyzing the information may determine which rider should lead on uphill portions, which rider should lead on downhill portions, which rider should lead on flat portions, which rider is favored in head winds, etc., including how long the rider should lead.

Communication may include communicating with a team car or other vehicle. Communication may include communicating any of the route information, rider information or bicycle described above to a computer 150 in the vehicle or receiving route information, a program based on the rider, or information for adjusting the transmission.

Figure 6:
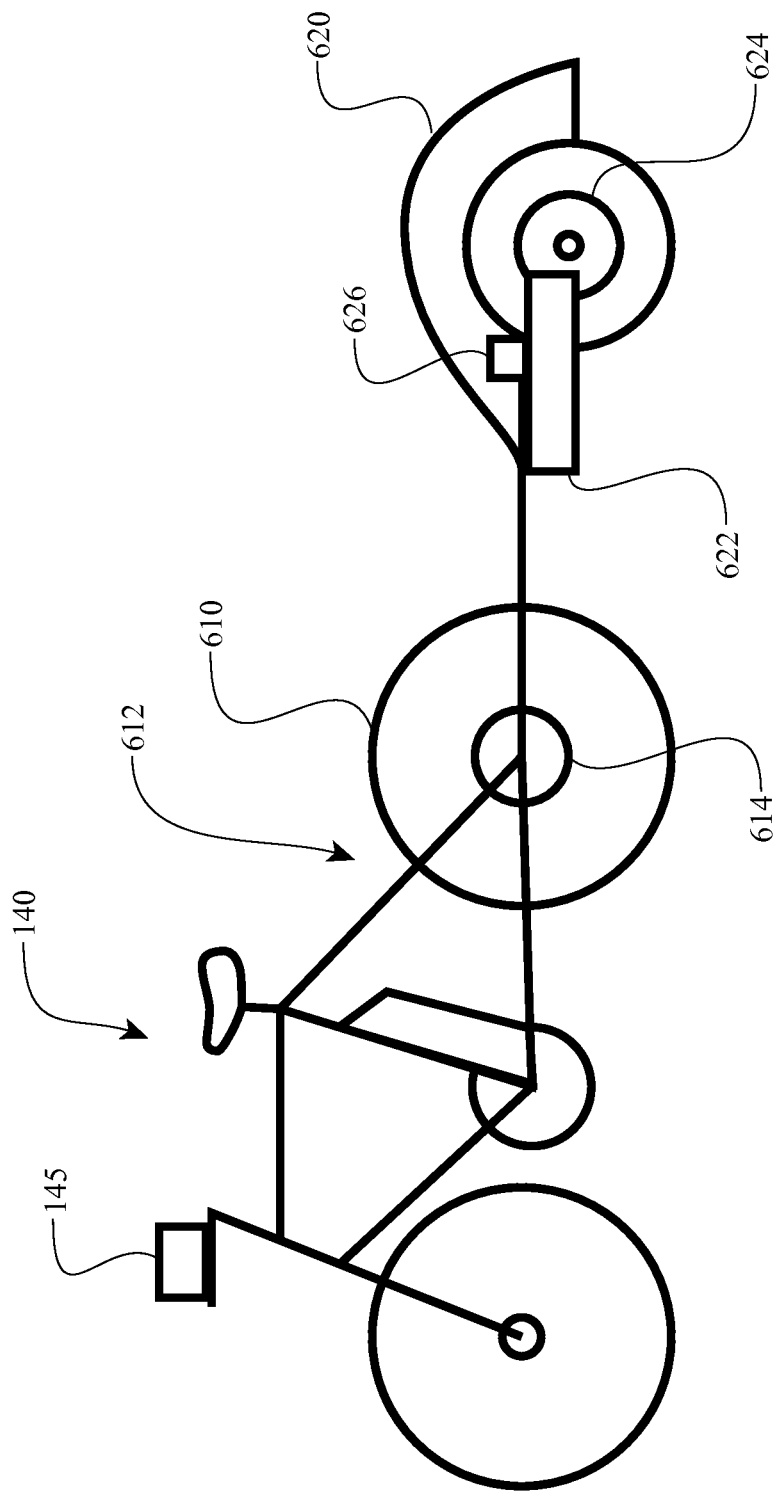
FIG. 6 depicts a diagram of a bicycle coupled to a trailer, illustrating a system employing a plurality of communicatively coupled web-enabled vehicle systems according to one embodiment.

Referring now to FIG. 6, communication may include communication between components on a bicycle. Components may include a hub, a transmission, a bottom bracket, a motor or the like. A bicycle 140 having wheels 610 may be coupled to a trailer 620 to allow the cyclist to push or tow a trailer. The trailer 620 may have a motor 622 coupled to transmission 624, such as a continuously variable transmission, and further communicatively coupled to controller 626. Embodiments may allow communication between controller 145 on bicycle 140 and controller 626 on trailer 620. In some embodiments, controller 145 communicatively coupled to transmission 614 or motor 612 on bicycle 140 may communicate one or more of a speed ratio, a wheel speed, a bicycle speed, a torque ratio, or a power generated to controller 626, and controller 626 associated with trailer 620 may control one or more of transmission 624 and motor 622 on trailer 620 to match the speed ratio or power output of bicycle 140 such that a hitch or other connection between bicycle 140 and trailer 620 does not sense a tensile force or a compressive force. In some embodiments, a single controller 145 may control motors 612 and 622 or transmissions 614 and 624. Advantageously, bicycles and trailers having continuously variable transmissions may easily cooperate to allow cyclists to pull a trailer (as depicted in FIG. 6) or push a trailer (not shown).

Communication between a bicycle 140 and controller 145, a mobile phone, or some other computing device 150, central server 110 or third party servers 160 may allow for better security of bicycle 140. For example, if bicycle 140 with controller 145 is communicatively coupled to a computing device 150, either through radio communications or through common networks, and someone attempts to move bicycle 140, controller 145 may send a communication to alert the owner that someone is attempting to move the bicycle 140. Embodiments may determine that bicycle 140 is being moved without permission due to bicycle 140 being out of Bluetooth® range with a smart phone, failure to pass a biometric test, failure to enter a correct pattern on a set of controller buttons, failure to actuate a hand grip to illuminate a set of LEDs in a desired pattern or configuration, or some other mechanical, optical, or electronic techniques. If bicycle 140 is stolen, controller 145 may continue to communicate with other bicycles 140, client computing devices 150, central server 110 and third party servers 160 to thwart the theft or retrieve bicycle 140. For example, communication with bicycle 140 by various third party computers 150 may allow bicycle 140 to be tracked along routes. Furthermore, embodiments may deactivate all or a portion of the functionality of bicycle 140 or controller 145 coupled to bicycle 140. For example, embodiments may oscillate a shifting mechanism between extreme speed ratios, may allow a drive wheel to only freewheel, may lock the transmission or a drive wheel into an uncomfortable or undesirable speed ratio setting, or may lock out the drive system such that the rear wheel is unable to spin. Locking the rear wheel may include locking a continuously variable planetary (CVP) transmission in an extreme ratio.

Using functionality and components described herein, embodiments may allow bicycles 140 to be used in an accessibility mode for riders with acute or chronic conditions. For example a rider may have an injured leg that is weaker than the other leg. Controller 145 may obtain from one or more sensors a plurality of signals indicating the rider is unable to generate sufficient power on the injured leg to propel bicycle 140. For example, controller 145 may receive signals indicating torque applied to each pedal throughout a cycle and determine based on a predetermined difference in applied torques or based on a minimum torque value that one leg is injured. Accordingly, controller 145 may adjust how much power should be applied per rotation and apply that power disproportionally to bicycle 140 as needed to assist the rider. The application of power may include providing power at the start to help the bicycle get started and stabilize, and may provide more power than normal when going up hills or as needed. As the rider heals, embodiments may control a bicycle transmission or transmission/motor combination to assist the rider in rehabilitating the leg. For example, controller 145 may utilize a control scheme in which the rider will not be able to provide power for the first five minutes in order to give a rider time to increase circulation, stretch ligaments or otherwise warm up his/her leg. After the leg is warmed up the control scheme may switch to require increased power from the rider using the leg being rehabilitated. Using a CVP, embodiments may determine which leg to assist and may further determine angles of rotation in which to add power, require more rider power, etc. An advantage is that a rider is able to rehab the leg outside (instead of riding a stationary bike in an office). Another advantage is that the rider is able to receive a rehab program from a physician or other healthcare provider, implement the program as the physician intended, record values for the rider's performance parameters (either normalized or raw data), and transmit the rider's performance parameters to a physician or other healthcare provider office (i.e., client computing device 150 or third party server 160) so the rider's rehab can be accurately assessed.

Other conditions including chronic health issues or disabilities may be addressed as well. A rider may enter a desired program directly to controller 145 or controller 145 may communicate to receive instructions over a network, via Wi-Fi or Bluetooth®, etc. Embodiments may then customize operation of bicycle 140 according to the rider's inputs, or bicycle 140 may be operated according to a protocol established by a healthcare provider, trainer, etc., and communicated to controller 145.

Embodiments of a system include controller 145 capable of receiving signals from a plurality of sensors, calculating values based on the signals, retrieving information stored in local memory or in a database communicatively coupled to controller 145, calculating or otherwise determining one or more courses of action, control schemes, routes, or modes, and implementing a course of action, control scheme, route or mode accordingly.

Figure 7:
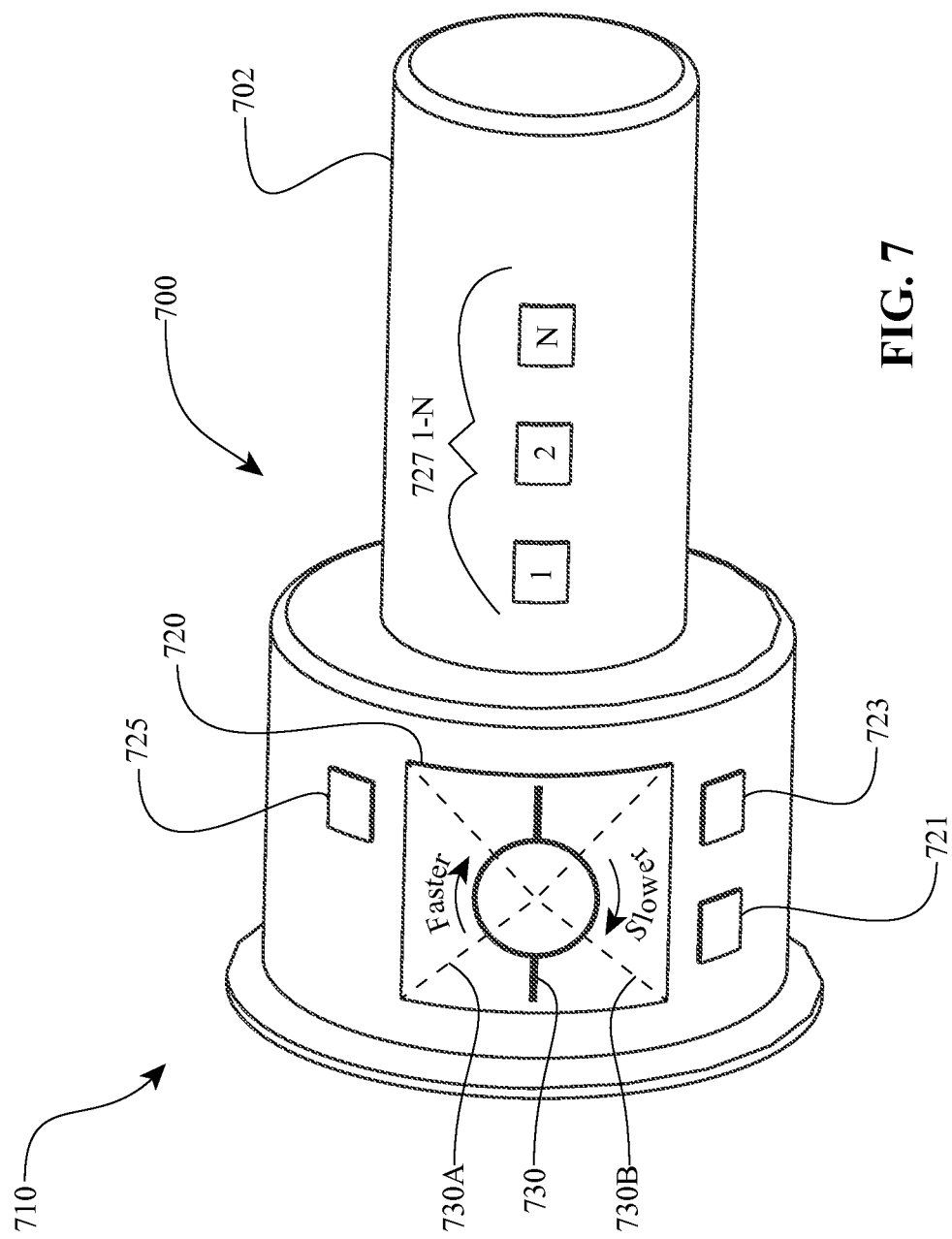
FIG. 7 depicts a perspective view of one embodiment of a controller integrated with a hand grip, illustrating a system and method for communication with other web-enabled bicycles and computing devices.

In some embodiments, a controller (such as controller 145) may be integral with a hand grip or otherwise mounted on a bicycle handlebar. FIG. 7 depicts a perspective view of one embodiment of a controller integrated with a hand grip. Controller 700 may also be referred to as the ratio controller or the hand grip controller.

While riding the bicycle, a rider may grip a cover portion, such as hand grip 702. When the rider wants to alter the transmission ratio so that more rotations of the pedals (the input) produce fewer rotations of the rear wheel (the output), the user rotates hand grip 702. Controller 700 may send a signal to a hub via wireless communication or as a wired connection.

A unique element of the shifter is visual display 720 of the input/output ratio. This is located on a housing 710. Icon 730 may be presented in display 720. As hand grip 702 is rotated, icon 730 changes angular positioning. This visually represents the transmission ratio. Thus, if the rider is operating at maximum pedal rotation, icon 730 may be tilted at a first angle 730A. If the rider is climbing a steep hill and is operating at the highest torque ratio, icon 730 may be tilted at a second angle 730B. Icon 730 may be tilted at any angle between angles 730A and 730B, including horizontal. Controller 700 may further include GPS receiver 723, cadence indicator 721, communication transmitter/receiver 725, or sensors 727-1 to 727-n.

In some embodiments, a controller may be integral with a hub or hub interface. In some embodiments, a hub interface may include GPS receiver, Bluetooth™ receiver, 3-axis accelerometer, or sensors. Those skilled in the art will appreciate that transmitter/receivers may communicate with each other wirelessly and may also communicate with other transmitter/receiver devices.

The plurality of sensors may include a 3-axis accelerometer, a tire pressure sensor, a battery level sensor, a battery current draw sensor, a rear view camera, an air quality sensor, thermometer, barometer or other weather sensor, an input speed sensor, an output speed sensor, a speed ratio sensor, an encoder position sensor, a brake wear sensor, or some other sensor capable of providing information related to location, terrain, weather, rider health, rider performance, bicycle state or bicycle performance.

In some embodiments, a sensor or other component may be integral with the bicycle, such as by mechanically, thermally or chemically coupling the sensor or component to the frame. In some embodiments, a sensor or other component may be integral with a component of the bicycle, such as by incorporating the sensor or component with other components. In some embodiments, a sensor or component may form part of a mobile computing device that may or may not be coupled to the bicycle, but is communicatively coupled to the bicycle. An application ("app") may be downloaded onto a smart phone or other mobile computing device 150 and the app may communicate information to a controller on the bicycle.

A GPS receiver may be integral with bicycle 140 or integral with controller 145 associated with bicycle 140. The GPS receiver may get location information and communicate with a controller to determine corresponding terrain information. In some embodiments, controller 145 may allow a user to enter waypoints and may then use these waypoints to determine location information. Waypoints may be entered in latitude/longitude or other coordinate system.

A 3-axis accelerometer may be integral with bicycle 140 or may be communicatively coupled to controller 145 associated with bicycle 140. A 3-axis accelerometer may be used to determine speed, a bicycle turning, and a grade of a road. In some embodiments, signals from a 3-axis accelerometer may be analyzed by controller 145 to determine route information and rider information, and this information may be used to control the motor and the shifter instead of using speed signals. Information from a 3-axis accelerometer may be used for ensuring maximum acceleration in a performance mode and maintaining some minimum acceptable acceleration in an efficiency mode. For example, using both motor sensors and transmission sensors, embodiments may accelerate bicycle 140 to a preferred cadence using acceleration as the control signal considering the commanded cadence. Information from a 3-axis accelerometer may be used to measure grade, such that, if the rider enters his/her weight, the controller may use the grade, the acceleration and the rider weight to calculate torque. Analyzing information from a 3-axis accelerometer in conjunction with a weather sensor capable of detecting rain, controller 145 may modify acceleration in curves due to the inclement weather.

An altimeter may be integral with bicycle 140 or may be communicatively coupled to controller 145 associated with bicycle 140. An altimeter may be used to determine altitude. Information from an altimeter may be used in conjunction with information from a 3-axis altimeter or GPS information to further refine the position information used by the controller.

A thermometer, barometer, humidity sensor or other environmental or weather sensor capable of providing information about the environment or weather. Information received from weather sensors may be used in conjunction with rider information and bicycle information for customizing training, including operating in an accessibility mode for people with injuries, health issues or disabilities. For example, a person with a weak heart or with a history of heat injuries may want to ride, but his/her doctor has instructed them to not let their heart rate exceed a maximum heart rate or avoid strenuous exercise. Embodiments may use weather information to determine the maximum power level that the rider could expend and not exceed the maximum heart rate and adjust the control scheme for a transmission, a motor, or a transmission/motor combination. Other modes could include a "no sweat" mode to keep the rider from sweating, which may be advantageous for commuters or individuals who rely on their bicycles for their businesses. In some embodiments, information from a thermometer, barometer, humidity sensor or other environmental or weather sensor capable of providing information about the environment or weather may be retrieved by controller 145. In other embodiments, information from a thermometer, barometer, humidity sensor or other environmental or weather sensor capable of providing information about the environment or weather may be sent to central server 110, client computing device 150 or third party sever 160, and an instruction based on this information may be sent to controller 145.

Other sensors include a fingerprint recognition or other biometric sensor to allow users to unlock or lock a bicycle using biometrics, a voice recognition sensor to allow a user to interact with a controller using voice commands, a proximity sensor used to turn on a light when the user nears the bicycle or warn the rider when he/she nears curbs, other riders, and the like.

A camera may be used in conjunction with a bicycle for various functionality. In some embodiments, a camera may be used to allow a person who wants to ride bicycle 140 to contact the owner of bicycle 140. The person may stand so his/her face is visible to the owner and the owner, upon recognizing the person, may send a code to bicycle 140 or controller 145 with an instruction to unlock bicycle 140. This embodiment may also allow a bike owner to register bicycle 140 such that the owner does not need a key to unlock bicycle 140. A camera mounted facing the front of bicycle 140 may be used to record a ride. Terrain or location information may be included with the camera recording.

The location of any sensor on bicycle 140 may vary. For example, sensors may be positioned on the frame of bicycle 140, including on a subassembly or component that they are monitoring.

A coaching application may be used in conjunction with rider information, terrain information, location information, and bicycle information. Using the information, the coaching application may provide audible information about how much time or distance is left in a training run or route, pace, distance, and general motivational sayings.

Embodiments disclosed herein may be used with other technology as well to improve the rider experience. Heads-up display glasses and shields are becoming more popular. Embodiments disclosed herein may communicate with any transparent display configurable to display information to a user such that the user does not need to look away from the important viewpoint of the road ahead. In addition to being able to display information about battery life, estimated travel distance until a battery is depleted, speed, energy expended by a rider, rate of energy expended by a rider, heart rate, and other parametric information, embodiments may also display digital images superimposed on the route.

Examples of digital images include, but are not limited to, highlighting the color of a road to indicate a change in terrain, an area that could be dangerous or an area near the end of a route; adding a virtual marker to mark a distance traveled, a distance left, a midpoint, or the end of a route; a pacesetter including a virtual image of a cyclist or a line on the ground to indicate a target time or distance; a marker to indicate when to start a sprint or a line marking the shortest route, or a support sign or banner for motivational support.

A method for using the heads up display in combination with a bicycle may include a controller determining a set of markers, cues, goals or references to be presented to a user. The controller may use location information, terrain information, rider information and bicycle information to determine a route. As the route is determined, the controller may further identify points or areas on the route which will have a marker, a cue, a goal or a reference for the rider. For example, the controller may determine that there is a hill on the route and further determine that there should be a marker marking the top of the hill. The controller may further determine large the marker should appear to be to the rider. The controller may then determine how far away the marker will be visible to the rider. Determining how far away the marker will be visible depends not only on the size of the marker, but on the terrain, whether the route up the hill goes around a corner such that the marker will not be visible until very close, whether there are trees or structures in the way, etc. The controller may then determine how large the marker should appear when first viewed by the rider. Then, as the rider nears the location at which the controller has determined the marker should be in sight, the controller may send a file or set of instructions to the heads up display for displaying the marker. As the rider nears the marker, the controller is able to adjust the size to compensate for the approaching rider such that the marker appears to be increasing in size.

As described above, embodiments may use a top of a hill for a reference point for the marker. Other analyses may determine that a turn exists by comparing location information to identify a location in which a bearing changes or when there is an abrupt change in both latitude and longitude for a position. Embodiments may also analyze a topographical map to identify natural terrain elements such as hills, valleys, ridges, draws, mountains, valleys, spurs, cuts, depressions, trees, rivers, lakes, streams, ponds or the like, or man-made structures such as buildings, bridges, culverts, walls, intersections, curves in the road, rest areas, railroads or the like.

Embodiments disclosed herein have been described as they pertain to a bicycle. However, those skilled in the art will appreciate that these concepts may be equally useful in other settings and are thus not to be limited.

What is claimed is:

1. A bicycle comprising:
   a frame;
   two wheels supported by the frame;
   a transmission;
   a bicycle speed sensor; and
   a controller communicatively coupled to the transmission and the bicycle speed sensor, the controller having a processor and a non-transitory memory storing a set of instructions executable by the processor to
      obtain rider information,
      obtain bicycle information including information from the bicycle speed sensor,
      obtain location information associated with the bicycle,
      obtain terrain information associated with the location information, and
      in response to an anticipated change in terrain, cause a change in a ratio of the transmission.

2. The bicycle of claim 1, wherein the non-transitory memory of the controller further stores a set of instructions executable by the processor to control the transmission according to a control scheme for the rider.

3. The bicycle of claim 1, further comprising a motor communicatively coupled to the controller, wherein the ratio of the transmission comprises a speed ratio, and wherein the non-transitory memory of the controller further stores a set of instructions executable by the processor to change a speed of the motor and the speed ratio of the transmission in response to an anticipated change in terrain.

4. The bicycle of claim 1, further comprising a motor communicatively coupled to the controller, wherein the ratio of the transmission comprises a torque ratio, and wherein the non-transitory memory of the controller further stores a set of instructions executable by the processor to change a speed of the motor and the torque ratio of the transmission in response to an anticipated change in terrain.

5. The bicycle of claim 1, wherein the non-transitory memory of the controller further stores a set of instructions executable by the processor to:
   determine a portion of a route in which anticipatory shifting is undesirable; and
   suspend a control scheme when the bicycle is within the portion of the route in which anticipatory shifting is undesirable.

6. The bicycle of claim 5, wherein the set of instructions executable by the processor to suspend the control scheme comprises instructions executable by the processor to:
   terminate the control scheme; or
   maintain the transmission at a last state before the bicycle entered the portion of the route in which anticipatory shifting is undesirable.

7. A method for controlling a transmission of a bicycle by a controller communicatively coupled to a bicycle speed sensor and the transmission, the method comprising:
   obtaining rider information;
   obtaining bicycle information including information from the bicycle speed sensor;
   obtaining location information associated with the bicycle;
   obtaining terrain information associated with the location information;
   controlling the transmission according to a control scheme for the rider; and in response to an anticipated change in terrain, causing a change in a ratio of the transmission.

8. The method of claim 7, wherein the ratio of the transmission comprises a speed ratio.

9. The method of claim 8, wherein the controller is further communicatively coupled to a motor, and wherein the method comprises changing a speed of the motor and the speed ratio of the transmission in response to an anticipated change in terrain.

10. The method of claim 7, wherein the ratio of the transmission comprises a torque ratio.

11. The method of claim 10, wherein the controller is further coupled to a motor, and wherein the method comprises changing a speed of the motor and the torque ratio of the transmission in response to an anticipated change in terrain.

12. The method of claim 7, wherein the method further comprises:
determining a portion of a route in which anticipatory shifting is undesirable; and
suspending the control scheme when the bicycle is within the portion of the route in which anticipatory shifting is undesirable.

13. The method of claim 12, wherein suspending the control scheme comprises terminating the control scheme.

14. The method of claim 12, wherein suspending the control scheme comprises maintaining the transmission at a last state before the bicycle entered the portion of the route in which anticipatory shifting is undesirable.

15. A bicycle comprising:
a frame;
two wheels supported by the frame;
a drivetrain configured to propel the bicycle;
a controller communicatively coupled to a network, the controller having a processor and a non-transitory memory storing a set of instructions executable by the processor to
obtain rider information for a rider of the bicycle,
obtain bicycle information,
determine location information associated with the bicycle,
obtain terrain information associated with the location information,
determine a set of routes for presentation to the rider based on the rider information, the bicycle information, the location information, and the terrain information, and
present the set of routes to the rider; and
a transmission, wherein the non-transitory memory of the controller further stores a set of instructions executable by the processor to control the transmission according to a control scheme for the rider and further executable to cause a change in a ratio of the transmission in response to an anticipated change in terrain.

16. The bicycle of claim 15, wherein the non-transitory memory of the controller further stores a set of instructions executable by the processor to:
receive an indication of a route from the rider;
receive at least one signal from a biometric sensor; and
determine at least one alternate route based on the indicated route and the at least one signal received from the biometric sensor.

17. The bicycle of claim 16, wherein the at least one signal includes information indicative of a heart rate, and wherein the processor is configured to determine an alternate route based on a desired maximum heart rate.

18. The bicycle of claim 16, wherein the at least one signal includes information indicative of a heart rate, and wherein the processor is configured to communicate with a central server to determine an alternate route based on heart rates associated with other riders that rode the alternate route.

19. The bicycle of claim 15, wherein the bicycle further comprises a battery, wherein the drivetrain comprises a motor coupled to the battery, and wherein the non-transitory memory of the controller further stores a set of instructions executable by the processor to provide supplemental propulsion to the bicycle, via the motor, based at least in part on a power level of the battery.

20. The bicycle of claim 19, wherein the non-transitory memory of the controller further stores a set of instructions executable by the processor to provide supplemental propulsion to the bicycle to increase the speed of the bicycle based at least in part on an indication of desired bicycle speed.

21. A controller for use with a bicycle having a frame, two wheels supported by the frame, and a drivetrain including a transmission for propelling the bicycle, the controller communicatively coupled to a network and configured to:
communicate with a GPS receiver to determine a location of the bicycle,
communicate with a map source and determine terrain information based upon the determined location of the bicycle,
receive information about the bicycle,
determine a set of routes available to a rider based on the location of the bicycle, the terrain associated with the location of the bicycle, and at least one performance characteristic of the rider,
control, during a ride along a selected route from the set of routes, the transmission according to a control scheme for the rider, and
cause a change in a ratio of the transmission in response to an anticipated change in terrain.

22. The controller of claim 21, wherein the controller is further configured to communicate with a display to display information regarding the set of routes.

23. The controller of claim 21, wherein the controller is further configured to receive information about a rider and determine performance characteristics of the rider associated with the bicycle.

24. The controller of claim 21, wherein the controller is further configured to, upon receiving an indication from the rider of a route selection, communicate information to one of a client computing device, a central server, and a third party server.

25. The controller of claim 24, wherein the controller is configured to communicate information to a third party server, and wherein the third party server is associated with one of a vendor associated with bicycle service or maintenance, a vendor associated with a route, and a vendor associated with rider services, equipment or apparel.

26. The controller of claim 21, wherein the controller is further configured to sense information about a biometric parameter.

* * * * *